United States Patent [19]

Utagawa

[11] Patent Number: 4,980,715
[45] Date of Patent: Dec. 25, 1990

[54] AUTOMATIC FOCUS ADJUSTING APPARATUS

[75] Inventor: Ken Utagawa, Kawasaki, Japan

[73] Assignee: Nikon Corporation, Tokyo, Japan

[21] Appl. No.: 489,740

[22] Filed: Feb. 28, 1990

Related U.S. Application Data

[63] Continuation of Ser. No. 368,147, Jun. 15, 1989, abandoned, which is a continuation of Ser. No. 231,660, Aug. 12, 1988, abandoned, which is a continuation of Ser. No. 131,094, Dec. 10, 1987, abandoned.

[30] Foreign Application Priority Data

Dec. 12, 1986 [JP] Japan .................................. 61-295888

[51] Int. Cl.⁵ .......................... G03B 13/36; G02B 7/28
[52] U.S. Cl. .................................. 354/402; 250/201.2
[58] Field of Search ............... 354/402, 406, 407, 408; 358/227; 250/201.2

[56] References Cited

U.S. PATENT DOCUMENTS

| | | | |
|---|---|---|---|
| 4,387,975 | 6/1983 | Araki | 354/407 |
| 4,531,157 | 7/1985 | Ishikawa | 358/227 |
| 4,671,640 | 6/1987 | Akada et al. | 354/402 |
| 4,702,584 | 10/1987 | Taniguchi et al. | 354/402 X |
| 4,783,677 | 11/1988 | Hamada et al. | 354/402 |

FOREIGN PATENT DOCUMENTS 214325 10/1985 Japan .

Primary Examiner—W. B. Perkey
Attorney, Agent, or Firm—Shapiro and Shapiro

[57] ABSTRACT

An automatic focus adjusting apparatus for adjusting a photo-taking lens of a camera employs a focus detecting device that includes a charge storage type image sensor device and a calculating device for calculating a defocus amount on the basis of the output of the charge storage type image sensor device. The charge storage type image sensor device stores charges according to incident light thereon during a charge storage period, and the calculating device calculates the defocus amount during a calculating period. In one embodiment, during the charge storage period and the calculating period, the photo-taking lens is driven at a constant speed on the basis of a correction amount required for the pursuit of a moving object to be photographed. After the calculating period the phototaking lens is driven on the basis of the defocus amount. Features of the invention are concerned with producing convergence deficiency signals; multiplying convergence deficiency signals by coefficients to provide correction amounts; controlling a mirror-up operation in accordance with whether an object moves; and determining whether an object moves.

26 Claims, 21 Drawing Sheets

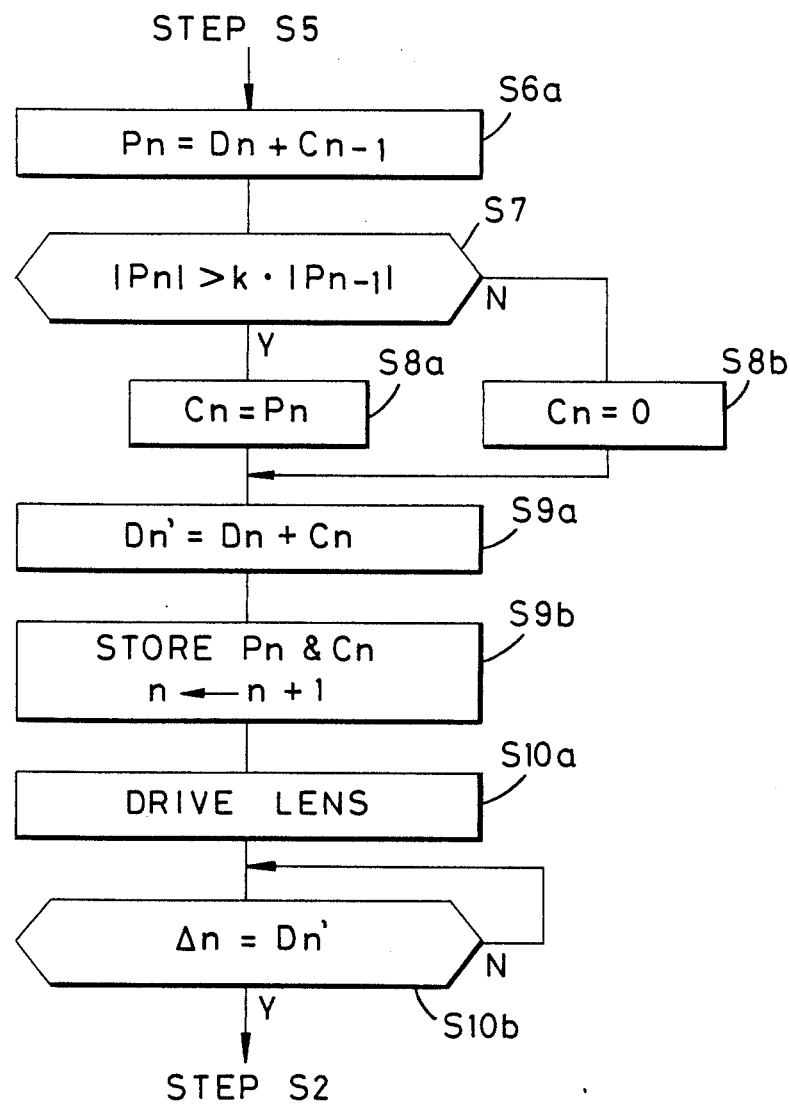

TIMING OF CALCULATING Dn

TIMING OF CALCULATING Dn

AUTOMATIC FOCUS ADJUSTING APPARATUS

This is a continuation of application Ser. No. 368,147, filed June 15, 1989, which is a continuation of application Ser. No. 231,660 filed Aug. 12, 1988, which is a continuation of application Ser. No. 131,094 filed Dec. 10, 1987, all of which are now abandoned.

BACKGROUND OF THE INVENTION

1. Field of the Invention

This invention relates to an automatic focus adjusting apparatus in a camera or the like, and in particular to a driving method having the function for pursuing, when an object is moving, the moving object so that the moving object is always in the in-focus state.

2. Related Background Art

The construction of a conventional automatic focus detecting apparatus which does not effect pursuit will first be described with reference to FIG. 1 of the accompanying drawings. A light emanating from an object a passes through an imaging optical system (a photo-taking lens) L and is directed via a quick return mirror M onto a viewfinder screen S which is normally in a position conjugate with a film surface F. Also, some light transmitted through the central translucent portion of the quick return mirror M is directed via submirror S.M. to focus detecting means 101. The focus detecting means 101 is of a known construction and is comprised of a focus detecting optical system, a charge storage type image sensor, a focus detection calculating portion and an image sensor drive control portion. After the termination of the charge storage, the defocus amount is intermittently calculated in the focus detection calculating portion. This defocus amount is an amount corresponding to the distance along the optic axis between the surface conjugate with the film which is a predetermined imaging plane and an image surface of the imaging optical system L.

Control means 102 receives the data regarding the defocus amount from the focus detecting means 101, drives the motor of lens drive means 104 to move a focus adjusting optical system included in the imaging optical system L and controls it so that the predetermined imaging plane and the image surface of the imaging optical system become coincident with each other. Where the motor of the lens drive means is not of the type in which accurate control of the drive amount is possible by an input signal, the control means 102 controls the driving of the focus adjusting optical system by the utilization of the feedback pulse of monitor means 103 comprised of a photointerrupter or the like and detecting the amount of movement of the focus adjusting optical system. Of course, where like a pulse motor, accurate control of the drive amount is possible by an input signal, the monitor means can be replaced by means for detecting an input pulse, or means equivalent thereto.

Generally, it is rarely practised to move the entire imaging optical system to thereby accomplish automatic focus adjustment, and it is the usual practice to move a focus adjusting optical system which is a part of the imaging optical system to thereby accomplish focus adjustment. In this case, the amount of movement of the focus adjusting optical system does not agree with the amount of movement of the image surface of the imaging optical system. Accordingly, actually, the value regarding the ratio between the feedback pulse number output by the monitor means 103 and the amount of movement of the image surface is pre-recorded in lens information generating means 105, and the control means 102 reads the value of this ratio from the lens information generating means 105 and calculates the necessary pulse number corresponding to the necessary amount of movement of the image surface (the defocus amount), and effects driving until the feedback pulse equals this necessary pulse number.

However, this point has no relation with the essence of the present invention, and in the ensuing description, the imaging optical system will be represented by an imaginary single lens so that the essential point of the present invention can be easily understood, and the description will be given on the assumption that the amount of movement of the imaginary single lens and the amount of resulting movement of the image surface are equal to each other.

Of course, even in a single lens or a lens in which all lens groups are axially movable, the above assumption is not appropriate at all if the distance to the object is very close and accordingly, in a macro-lens or the like, it becomes necessary to change the value of said ratio stepwise in conformity with the amount of axial movement of the lens, and the lens information generating means 105 needs to be capable of performing this. For simplicity herein what is concerned with the value of said ratio is left to the lens information generating means, and the description will be given using an imaginary single lens so that the description will be readily understood.

FIG. 2 of the accompanying drawings fixes the coordinates in such an imaginary single lens L for the convenience of description, and shows the locus of the imaging plane of the moving object in that case (solid line P) and the locus of the predetermined imaging plane conjugate with said film surface (dotted line Q). In FIG. 2, the abscissa represents time, and the ordinate represents the distance along the optic axis between said imaging plane and said imaginary single lens. In the figure, the coordinates $t_n$, $x_n$ represent the time $t_n$ when the charge storage of the focus detecting means 101 is started and the then position $x_n$ of said predetermined imaging plane, the coordinates $t_n'$, $x_n'$ represent the time $t_n'$ when the storage is terminated and the then position $x_n'$ of said predetermined imaging plane, and the coordinates $t_n^0$, $x_n^0$ represent the time $t_n^0$ when the focus detection calculation is terminated and the then position $x_n^0$ of said predetermined imaging plane.

FIG. 2 shows the manner of the focus adjusting operation in the so-called intermittent drive, and more specifically shows the manner in which the image surface is moving as indicated at $a_1$, $a_2$ and $a_3$ while pursuing the object as it moves as indicated at $a_1'$, $a_2'$ and $a_3'$ with time.

When as a result of the first calculation, the value $D_1$ regarding the difference in distance between the imaging plane $a_1$ of the object and the film surface $b_1$ is output from the focus detecting means 101 at time $t_1^{0'}$, the control means 102 drivingly controls the lens L to offset this defocus amount $D_1$ in the manner described previously. However, in the meantime, the object $a_1'$ is moving to $a_2'$ and therefore, even if the lens is driven by $D_1$ at time $t_2$ and the lens driving is stopped, the imaging plane already moved to $a_2$ by the midpoint of the next storage time, and as a result of the second calculation, the value $D_2$ regarding the difference in position between $a_2$ and $b_2$ is output from the focus detecting means 101 at time $t_2^0$. Thereupon, the control means 102 effects control to offset this defocus amount $D_2$ in the manner described previously, but even if the lens driving is stopped at time $t_3$ and the predetermined imaging plane is brought to a position $x_3$, the in-focus state will not take place because the object $a_2'$ has already moved to $a_3'$.

Thereafter, a similar matter as shown in FIG. 2 is repeated. Assuming that the object has not moved and that there have been no errors, it ought to have been possible that the object image surface and the predetermined imaging plane are made coincident with each other in one cycle of storage, calculation and drive, and even if 10% to 20% error has been included in the defocus amount which is the result of the calculation, it ought to have been possible that the object image surface and the predetermined imaging plane are made substantially coincident with each other in two to three cycles.

However, when the object is moving in the direction of the optic axis as shown in FIG. 2, the distance between the object image surface $a_n$ and the predetermined imaging plane $b_n$ gradually becomes smaller in the first two to three cycles, but the distance between the two thereafter is kept at a predetermined value determined by the speed of movement of the object image surface and the responsiveness to the automatic focus adjusting apparatus, and the state of follow-up with the in-focus state remaining unattainable continues.

What has been described above is an example of the case of the so-called intermittent drive in which the charge storage, the focus detection calculation and the lens driving are effected in the named order without overlaping one another. As another driving method, the so-called overlap drive in which the lens driving is effected along with the charge storage and the focus detection calculation is known from U.S. Pat. No. 4,387,975, but it is clear that even in such case, follow-up must be effected for a moving object. Thus, in the conventional driving systems, there is the disadvantage that follow-up is effected in the case of a moving object, and to solve this problem, the applicant has proposed in Japanese Laid-Open Patent Application No. 214325/1985 an automatic focus detecting apparatus having the object pursuing function which presupposes the overlap drive.

The aim of this apparatus is to provide movement detecting means for detecting movement of an object, correct the intermittently calculated defocus amount by the output of the movement detecting means every moment even during the interval period, effect the driving of the lens and pursue the moving object.

This known pursuit system is set up on the premise that the charge storage and the focus detection calculation are always effected alternately with no interval therebetween, and the lens driving is effected during the charge storage and during the calculation along therewith. After the termination of the focus detection calculation, simultaneously with the resumption of the next storage, convergence drive for making said predetermined image surface coincident with the image surface of the object supposed from the calculation is effected, and after the termination of the convergence drive, pursuit driving in which said predetermined image surface is moved in pursuit along the supposed movement of the image surface of the object.

Accordingly, it is often the case that during the storage, change-over takes place from the convergence drive to the pursuit driving and therefore, correction is made of the calculated defocus amount accompanying a variation in the speed of the lens driving during the storage. When the lens is being moved at a predetermined speed during the storage, the correcting process is easy to do because the calculated defocus amount is considered to correspond to the value of the measured distance in the middle of the storage time, but this correction is not easy when the speed of the lens changes during the storage. The aforementioned Japanese Laid-Open Patent Application No. 214325/1985 describes in detail a method of correcting the influence of the change in the speed of the lens with the time when the change in the speed occurs as a parameter.

In this example of the prior art, the case where both the convergence drive and the pursuit driving are at constant speeds is supposed as the premise of the correction, but actually, it is often the case that to satisfy high stopping accuracy and high-speed drive, the lens is controlled so that it is moved at a high speed where the defocus amount is great, and is gradually reduced in its speed to thereby bring it close to the desired position. Accordingly, the convergence drive is not a drive at a predetermined speed, and there is the disadvantage that if it is approximated by a constant speed, the error of the correction becomes great.

As a result, if detection of movement is effected with said indefinite correction added to the intermittently output defocus amount, correct detection of movement cannot be accomplished, and this has led to the disadvantage that the lens driving has a touch of hunting. Even if the pursuit of the object is not effected, if the calculated defocus amount is indefinite, the lens driving has a touch of hunting, but in the pursuit driving, the movement in the future is forecast by extrapolating from the result in the past and thus, the error becomes double by the extrapolation and the tendency toward hunting is increased.

SUMMARY OF THE INVENTION

It is the object of the present invention to overcome the above-noted disadvantages and to provide an automatic focus detecting apparatus which enables stable pursuit for an object having a component moving in the direction of the optic axis.

In accordance with one of the broader aspects of the invention, in one embodiment an automatic focus adjusting apparatus for adjusting a photo-taking lens of a camera, comprises:

(a) focus detecting means for producing a defocus amount conforming to the distance in the direction of the optical axis between a predetermined plane and the image of an object to be photographed by the photo-taking lens, the focus detecting means includes charge storage type image sensor means and calculating means for calculating the defocus amount on the basis of the output of the charge storage type image sensor means, the focus detecting means having a charge storage period and a calculating period which follows the charge storage period, the charge storage type image sensor means storing charges according to the incident light thereon during the charge storage period, the calculating means calculating the defocus amount during the calculating period;

(b) driving means for driving the photo-taking lens;

(c) correcting means for calculating a correction amount necessary for the driving of the photo-taking lens to pursue movement of the object to be photographed; and (d) control means for controlling the driving means so that the driving means drives the photo-taking lens at a constant velocity on the basis of the correction amount during the charge storage period and the calculating period, and drives the photo-taking lens on the basis of the defocus amount after the calculating period.

It is to be understood that constant speed drive referred to herein means that there is no substantial change in the driving speed (which in some cases may be zero), and that if a pulse-like drive is used, the interval between successive pulses is short enough so that there is no substantial change in speed.

Features of the invention relate to, but are not limited to, producing a convergence deficiency signal conforming to movement of an object within a period between two successive focus detection operations, the convergence deficiency signal indicating direction of movement of the object; multiplying an amount conforming to a convergence deficiency signal by a coefficient to provide a correction amount, the value of the coefficient being dependent upon the direction of movement of an object; changing the correction amount after the first of a plurality of successive exposure operations; controlling a mirror-up operation in accordance with whether an object moves and in accordance with a determination of whether or not the distance between a predetermined plane and the image of the object is within a predetermined range; determining whether an object moves by comparing a ratio of two successive convergence deficiency signals with a predetermined value or by determining whether the ratio is within a predetermined range; determining whether an object moves by determining whether the directions indicated by two successive convergence deficiency signals are the same; determining whether an object moves by determining whether a ratio of a first velocity to a second velocity is larger than a predetermined value or is within a predetermined range; and producing a movement amount signal according to the amount of movement of an object for a predetermined period shorter than the period between two successive focus detection operations, causing the driving means to start driving the photo-taking lens on the basis of the sum of the amount of a defocus signal and a correction amount, and thereafter repeatedly causing the driving means to drive the photo-taking lens by the amount of the movement amount signal.

BRIEF DESCRIPTION OF THE DRAWINGS

FIGS. 6A and 6B are flow charts of said automatic focus adjusting apparatus.

FIG.

DESCRIPTION OF THE PREFERRED EMBODIMENTS

A first embodiment of the present invention will hereinafter be described. This embodiment is a drive system completely following the intermittent drive in which lens driving is not effected at all during storage and calculation and corrective driving for pursuit is collectively effected after the termination of calculation and before the start of storage. The corrective driving for offsetting the movement of an object will hereinafter be referred to as pursuit driving.

Figure 1:
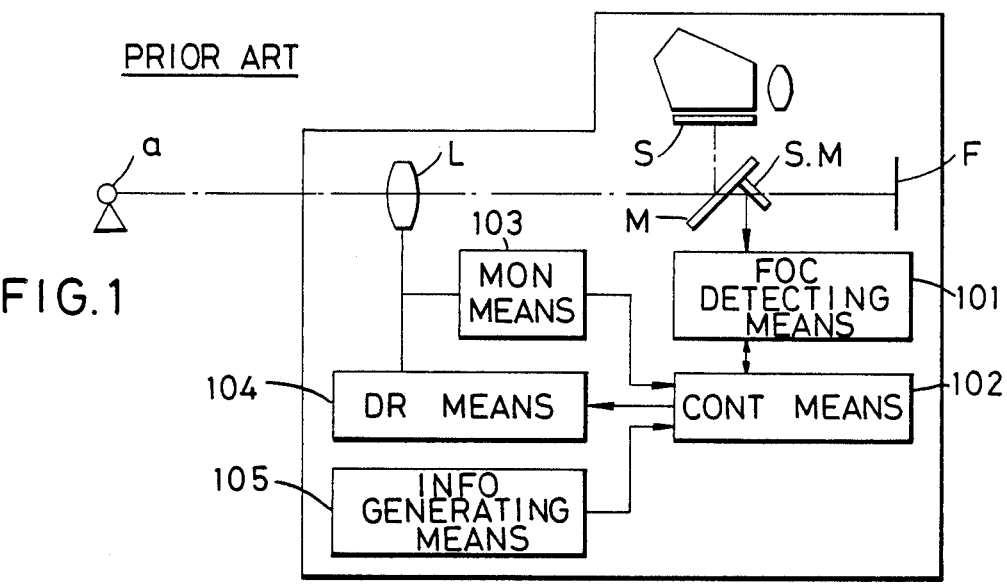
FIG. 1 is a block diagram of a conventional automatic focus adjusting apparatus applied to a camera.
Figure 3:
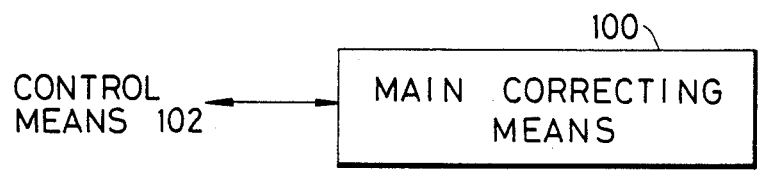
FIG. 3 is a block diagram of an automatic focus adjusting apparatus which is a first embodiment of the present invention.

FIG. 3 is a block diagram showing main correcting means 100 which is a part of the construction of the first embodiment, and the first embodiment is identical to the example of the prior art described with reference to FIG. 1, except for the main correcting means 100.

The main correcting means 100, in response to the output of focus detecting means 101 and the output of monitor means 103, judges whether there is any movement of the object, and when it is judged that there is a movement of the object, it calculates the amount of corrective driving for pursuing the object, and on the basis thereof, control means drives the lens to pursue the object.

Figure 2:
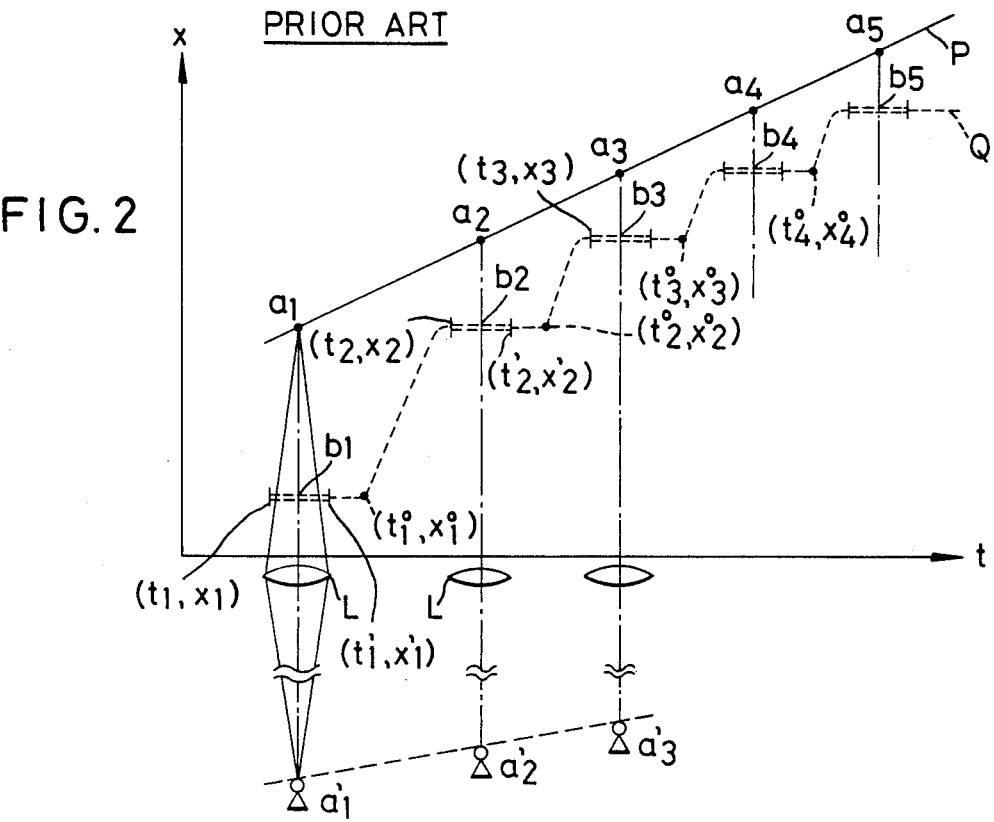
FIG. 2 shows the operation of the camera of FIG. 1.
Figure 4:
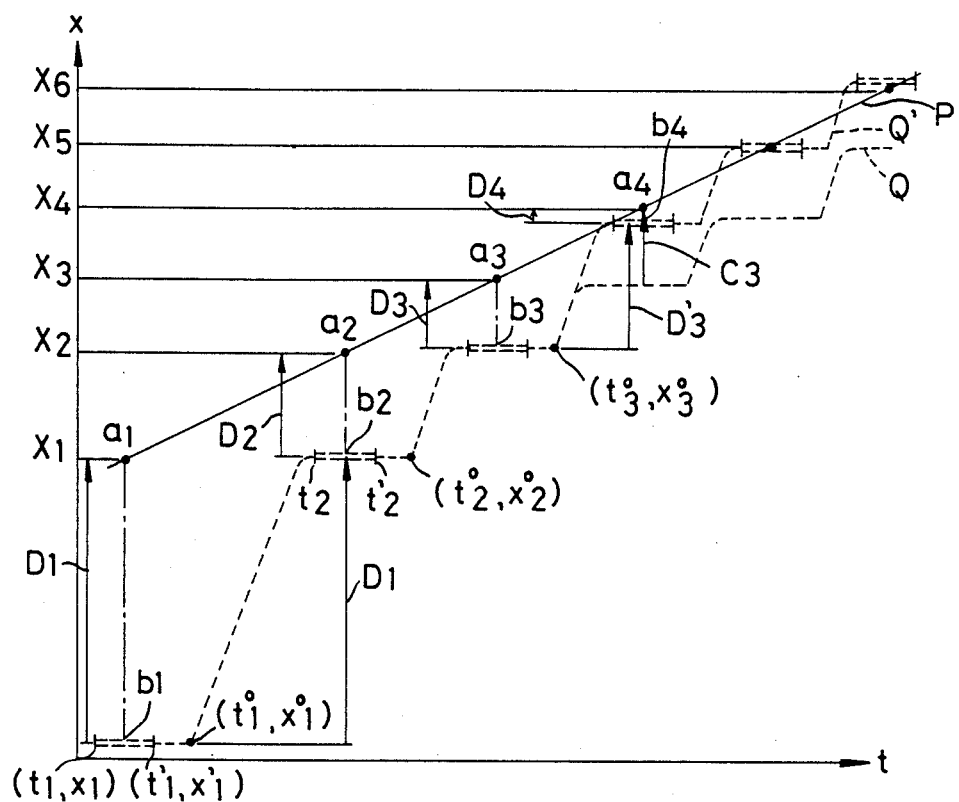
FIG. 4 is a graph showing the manner in which said automatic focus adjusting apparatus pursues an object to be photographed.

FIG. 4 shows the manner of pursuit in the first embodiment, and employs an expression method similar to that shown in FIG. 2. In FIG. 4, Q shows the manner of driving by the ordinary intermittent drive, and pursues the locus P of the object image. Also, Q' shows the manner of pursuit driving by the first embodiment, and it can be seen that pursuit is done along the locus P and the state in the vicinity of in-focus is always maintained. The difference between Q' and Q corresponds to the object movement correction amount calculated by said main correcting means.

The operation of the main correcting means will now be described.

Since the lens is not moved during storage and calculation, $x_1 = x_1' = x_1^0$ and the amount of focus deviation at time $(t_1 + t_1')/2$ is the distance difference $(x_1 - x_1^0)$ between at a point $a_1$ and a point $b_1$, and the defocus amount calculated by the focus detecting means 101 at the end $t_1^0$ of the calculation is equal to the value $D_1$ unless there is a detection error. The defocus amount at the nth time calculated by the focus detecting means 101 will hereinafter be represented by $D_n$.

The control means 102 controls lens driving means 104 by the use of $D_1$ calculated at time $t_1^0$ by the focus detecting means 101, and effects the driving while counting the feedback pulse of monitor means 103 until the amount of movement of the image surface by the lens becomes equal to the defocus amount $D_1$. As previously described, actually, the amount of movement of the lens corresponding to a certain amount of movement $\Delta Bf$ of the image surface regarding the photo-taking lens differs from one photo-taking lens to another, and also the feedback pulse number $\Delta n$ providing the amount of movement of the lens often differs from one photo-taking lens to another. Thus, a conversion coefficient $K_B$ for converting the movement $\Delta Bf$ of the image surface into the feedback pulse number $\Delta n$ by the relation that $\Delta n = K_B \Delta Bf$ is stored in lens information generating means 105 and the actual drive control is effected accordingly.

The operation of converting the movement of the image surface into the feedback pulse number has no relation to the essence of the present invention and is herein omitted for simplicity, and in the ensuing description, the amount converted into the amount of movement of the image surface is used. That is, it is to be understood that the defocus amount $D_n$ as well as the corrective drive amount $C_n$ to be described are all described in the measure of the amount of movement of the image surface.

Now, it is desirable in respect of responsiveness that the drive from the calculation termination time $t_1^0$ the storage starting time $t_2$ be at a high speed as much as possible, and on the other hand, it is necessary to gradually reduce the speed just before the drive is stopped and thus, this drive is a high-speed and non-constant speed drive. In the pursuit system of the prior application, storage of charge has been overlappingly effected in the meantime, but there has been the disadvantage that the correction of the defocus amount resulting from the non-constant speed lens driving cannot be accurately accomplished. This is due to the fact that because of the high driving speed, the detected image becomes equivalently blurred, the fact that the position determination error becomes great by the slight detection errors of the storage starting time, the speed changing time and the storage termination time and the fact that the speed becomes quite non-constant in the vicinity of stoppage. Accordingly, in the present embodiment, storage is resumed at the point of time $t_2$ whereat the high-speed and non-constant speed drive is terminated. At time $t_2^0$, the second defocus amount $D_2$ is calculated, and this is equal to a value $(x_2 - x_2^0)$ corresponding to the difference between a point $a_2$ which is the amount of focus deviation at an intermediate point between storage times $t_2 - t_2'$ and a point $b_2$, except for the error. If the object is not being moved and the detection error is sufficiently small, $D_2$ should be a very small value as compared with $D_1$ and therefore, theoretically, whether there is any movement of the object can be discriminated from the value of the ratio therebetween. Actually, it is seen that in the pursuit state like the locus Q for $n \geq 3$ shown in the prior art of FIG. 2, the defocus amount $D_n$ calculated at each time does not converge to zero forever but assumes a substantially constant value and $D_n/D_{n-1} \approx 1$. However, if additional corrective drive is effected in addition to the drive based on the ordinary defocus amount as shown by Q' in FIG. 4, it will become impossible to exercise the above-described discrimination by the use of the calculated defocus amount $D_n$ itself.

Figure 5:
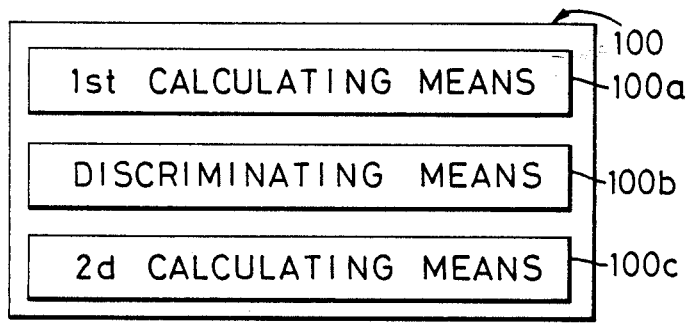
FIG. 5 is a detailed block diagram of the correcting means of said automatic focus adjusting apparatus.

So, as shown in FIG. 5, first calculating means 100a for calculating the amount of convergence deficiency is provided in the main correcting means 100, whereby an amount $P_n$ given by equation (1) below is calculated as the amount representing the convergence deficiency and this is used as the foundation.

$$P_n = D_n + [\text{preceding drive amount}] - D_{n-1} \qquad (1)$$

Equation (1) is as of the time $t_n^0$ when the defocus amount $D_n$ at the nth time was calculated, and $D_n$ is the latest defocus amount calculated by the focus detecting means 101 and $D_{n-1}$ is the defocus amount at the last time.

The [preceding drive amount] refers to a value $X(n-1)$ by which the lens was actually driven during the times $t^0_{n-1} - t_n$ or a calculated value $D_{n-1}'$ which provided the foundation for effecting the drive by said $X(n-1)$ as the result calculated at time $t^0_{n-1}$. Of course, the two are equal to each other $(D_n' = X(n))$ when there is no error.

Now, assuming that the corrective drive amount for pursuit is $C_n$, the drive amount $D_n'$ is as follows:

$$D_n' = D_n + C_n \qquad (2)$$

and by the use of this, equation (1) can be represented as follows:

$$P_n = D_n + C_{n-1} \qquad (1)'$$

As can be seen if FIG. 4 is viewed following the definition of equation (1) above, after $n \geq 3$, the the amount of convergence deficiency $P_n$ is nothing but the difference in distance between points $a_n$ and $a_{n-1}$ (for example, $P_4 = D_4 + C_3$), i.e., the drive amount of the object image.

There is no earlier result at the time $t_1^0$ when the result of the first calculation is provided and therefore, as the initial conditions, $P_0$ is set to a sufficiently great value, e.g., 1000 mm and $P_1$ is determined so that $P_1 = D_1$. Accordingly, in this case, $P_1$ does not correspond to the amount of movement of the object and $|P_1/P_0| < 0.1$.

So, as shown in FIG. 5, object movement discriminating means 100b is provided in the main correcting means 100 to discriminate whether there is any movement of the object.

A specific example of the object movement discriminating means will now be described. Variations in the amount of convergence deficiency $P_n$ as a result of the pursuit driving of the moving object effected in accordance with a routine to be described as shown by Q' in FIG. 4 on the premise that there is a certain degree of detection error are shown in Table 1 below.

TABLE 1

| n | 1 | 2 | 3 | 4 | 5 | 6 | 7 |
|---|---|---|---|---|---|---|---|
| $P_n$ (mm) | 10 | 1.86 | .54 | .32 | .42 | .38 | .35 |
| $\frac{P_n}{P_{n-1}}$ | — | .186 | .29 | .59 | 1.31 | .90 | .92 |

In this example, the first amount of convergence deficiency $P_1$ is as great as 10 mm and at n=2 and 3, $P_n$ converges rapidly, but does not reach 0.05-0.15 mm or less which corresponds to the in-focus tolerance, and at n=4-7, the value of $P_n$ is constant at approximately 0.4 mm. The fact that even at and after n=3-4, the value of $P_n$ does not converge within the in-focus tolerance but becomes substantially constant shows the movement of the object, and the then value of $P_n$ corresponds to the movement of the image surface resulting from the movement of the object in one cycle.

Thus, from the fact that $P_n$ is within the range of the order of $0.5 \leq P_n/P_{n-1}$, it can be judged that the object is moving. If the object is stationary, the current defocus amount is usually below 20% or 30% of the preceding defocus amount. Actually, the object movement discriminating means compares $P_n/P_{n-1}$ with a predetermined constant (threshold value) k, thereby discriminating whether the object is moving. When the influences of various errors are considered, the range of the practical value of k is $0.3 \leq k \leq 0.8$ and most suitably considered to be $0.4 \leq k \leq 0.6$. The object movement discriminating means 100b judges that there is a movement of the object when $P_n/P_{n-1} \geq k$.

It is also seen that the movement of the image surface corresponding to the movement of the object in the then one cycle is given substantially by $P_n$. Accordingly, second calculating means 100c for calculating the object movement correction amount is further provided in the main correcting means 100, whereby the corrective drive amount $C_n$ for pursuit is calculated. That is, when the object movement discriminating means judges that there is a movement of the object, $$C_n = P_n,$$

and when said object movement discriminating means judges that there is no movement of the object, $$C_n = 0.$$

A description will now be given using the flow chart of FIG. 6A which conceptually shows the flow of processing and the flow chart of FIG. 6B which specifically shows the operation of the first embodiment.

First, at step S1, the aforedescribed setting of the initial value is effected. At step S2, the image sensor starts storing charge, and at step S3, the image sensor stops storing charge, and the image output of the charge storing type image sensor of the focus detecting means is supplied to the focus detection and calculation portion in the focus detecting means. Subsequently, at step S4, focus detection and calculation is started, and at step S5, the calculation is terminated and the defocus amount $D_n$ is calculated. When the defocus amount $D_n$ is thus output from the focus detecting means, the control means 102 usually effects the driving of the lens on the basis of this data. In the present embodiment, however, the defocus amount $D_n$ is first subjected to the processing for pursuit driving by the main correcting means 100.

Step S6 corresponds to the first calculating means 100a in the main correcting means 100 and calculates the amount of convergence deficiency $P_n$. Step S7 corresponds to the object movement discriminating means 100b, and at the step S7 of FIG. 6B, if $|P_n| > k \cdot |P_{n-1}|$, it is judged that the object is moving. Step S8 corresponds to the second calculating means 100c for calculating the object movement correction amount, and calculates the correction amount $C_n$ in conformity with whether there is any movement of the object. Then, at step S9, the drive amount $D_n'$ is calculated. The step S9 of FIG. 6A comprises the steps S9a and S9b of FIG. 6B. This drive amount $D_n'$, as previously mentioned, is an amount converted into the amount of movement of the image surface, and the control means 102 controls the drive by linking the correspondence relation between the value of this $D_n'$ and the feedback pulse from the monitor means 103 by the conversion coefficient $K_B$ stored in the lens information generating means 105 as previously described.

Then, at step S9b, the value necessary for the next calculation is stored, and at step S10a, driving is started, and the driving is continued until the drive stop condition at step S10b is satisfied, that is, until $\Delta n = D n'$. When the stop condition is satisfied, the flow returns to step S2, where storage is resumed.

Thus, the first embodiment is the intermittent type drive system in which charge storage, calculation and driving are successively effected without overlapping one another even when pursuit is done. Accordingly, as described as $Dn' = Dn + Cn$ at step S9a, the drive amount Dn' is given as the total of the defocus amount Dn and the corrective drive amount Cn for pursuit.

If the drive amount calculated at step S9a has been completely achieved by the execution of steps S10a and S10b, there will be no problem, but when a difference occurs between the calculated drive amount and the actual drive amount, the calculation of the amount of convergence deficiency Pn at step S6a is incomplete by equation (1)' and it is necessary to use equation (1). In that case, as the value of the preceding drive amount in equation (1), it is necessary to use not $D_{n-1}$ calculated at the last time, but a value obtained by calculating back the preceding actual drive amount X(n−1) from the total of the feedback pulse.

Thus, according to the first embodiment, the intermittent drive is completely followed and accordingly, the lens remains stopped during the storage time and therefore, the accuracy of the calculated defocus amount is not degraded as in the case of Japanese Laid-Open Patent Application No. 214325/1985, but whether there is any movement of the object can be accurately determined and accurate pursuit driving becomes possible.

Also, Japanese Laid-Open Patent Application No. 214325/1985 which discloses the conventional pursuit system is based on the premise that driving is effected in parallel both during the storage time and the calculation time and therefore, it has suffered from the disadvantage that the microcomputer is endowed with multi-task and the number of event counters and timers is limited and the use of a microcomputer of insufficient calculating ability will lead to the difficulty of programming or the impossibility of quick processing.

However, in the pursuit software according to the present embodiment, the intermittent drive is employed and multi-task never takes place and even if time is not monitored at all, sufficiently effective pursuit driving is possible, and this leads to the merit that programming is easy and at the same time, any situation can be sufficiently coped with by the ability of the microcomputer which runs the present state drive software.

Figure 6A:
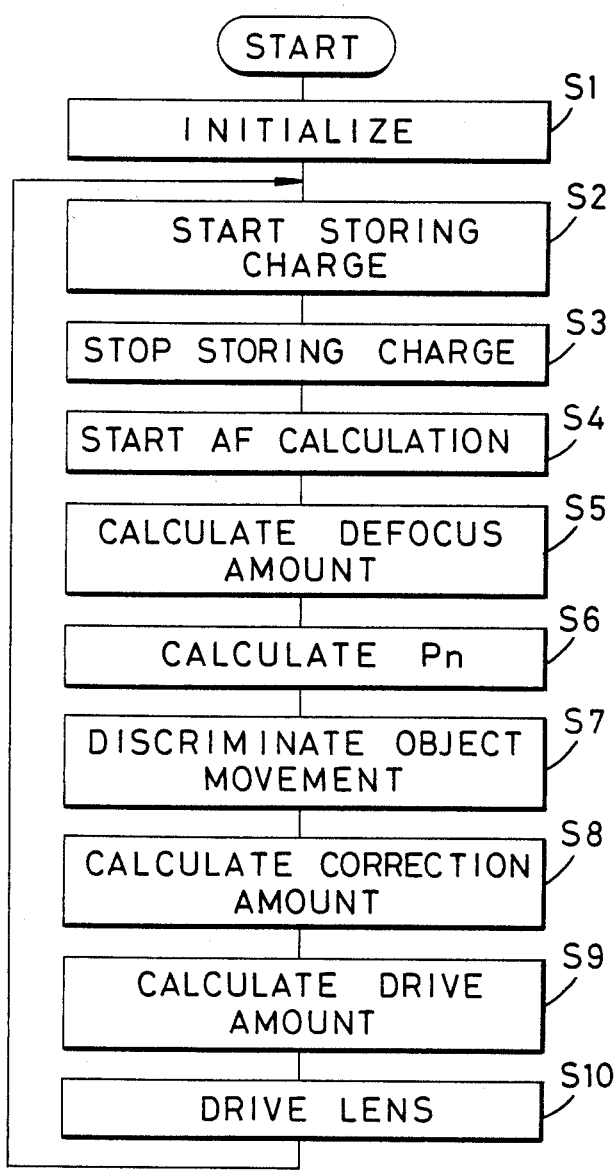

Also, as regards the amount of software to be actually added, pursuit driving can be accomplished merely by adding the few calculation steps shown in FIGS. 6A and 6B to the conventional software of intermittent drive and therefore, the present invention is excellent in the fitness to the conventional software.

A description will now be given of a second embodiment in which the processing of the object movement discriminating means 100b described in connection with the first embodiment is made more accurate.

The correction amount Pn when it has been judged that there is a movement of the object need not always be strictly set as previously described, and for example, the correction amount Pn may be multiplied by a coefficient approximate to 1, and in the case of a touch of overrun in the drive control of the lens, the coefficient may be set to less than 1 (0.9, 0.8, . . . ), and in the case of a touch of underrun, the coefficient may be set to more than 1 (1.1, 1.2, . . . ).

[Second Embodiment]

Figure 7:
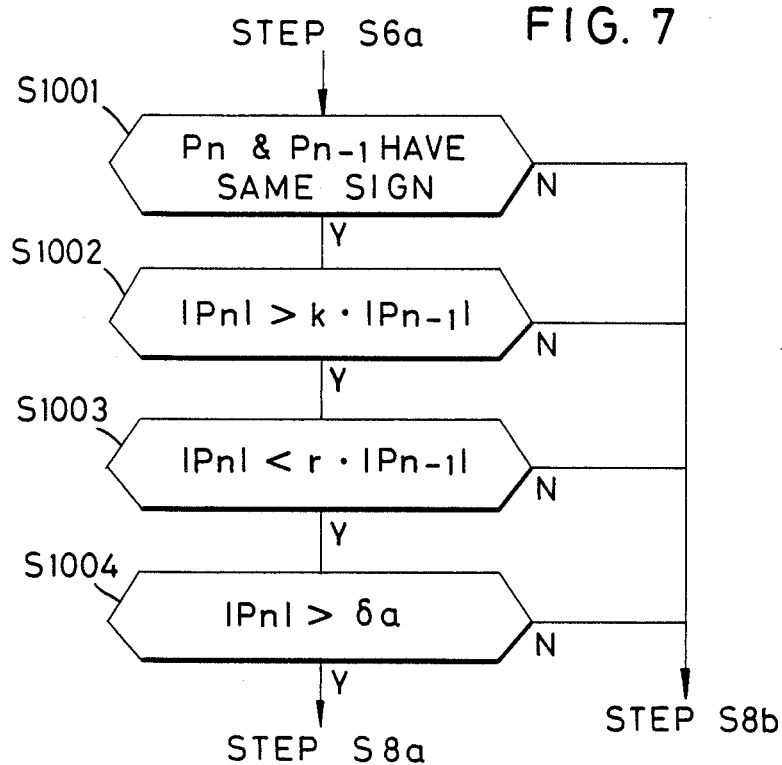
FIG. 7 is a flow chart of an automatic focus adjusting apparatus which is a second embodiment of the present invention.

As described in connection with the first embodiment, when the object movement discriminating means has judged that there is a movement of the object, intermittent drive (pursuit driving) including the pursuit correction is effected, and when the object movement discriminating means has judged that there is no movement of the object, ordinary intermittent drive (convergence drive) is effected. However, if the judgment accuracy of the object movement discriminating means is not sufficient, and this means it judges by mistake that there is a movement of the object when there is no movement of the object, there will arise the problem that the driving operation assumes a touch of hunting. A method of preventing wrong judgment in order to solve such problem will hereinafter be described with reference to FIG. 7. The flow chart of FIG. 7 replaces the step S7 described in connection with the first embodiment, and at step S1001, whether the current amount of convergence deficiency $P_n$ and the preceding amount of convergence deficiency $P_{n-1}$ are of the same sign is examined, whereby whether the object is moving is judged, and if they are not of the same sign, it is judged that the object is not moving, and if they are of the same sign, whether the object is certainly moving is judged at the next decision step S1002. The reason for judging any movement of the object at the two stages of steps S1001 and S1002 is to avoid judging that the object is moving when $|P_n| > k \cdot |P_{n-1}|$ is satisfied but $P_n$ and $P_{n-1}$ are of different signs. The judgment that $P_n/P_{n-1} > k$ may also be used with the conditions of steps S1001 and S1002 put in order.

Now, consider a case where the object has abruptly deviated from the focus detection field. In this case, when there occurs a case where the condition of step S1002 is satisfied (for example, when $P_n/P_{n-1} \geq 4$), the lens driving is effected by the defocus amount based on $P_n$, and this leads to the problem that substantial overrun occurs. In order to solve this problem, there is provided the judgment by $|P_n| < r \cdot |P_{n-1}|$ of step S1003, where r is a constant of the order of $1.2 \leq r \leq 3$. When $|P_n|$ is quite large as compared with $|P_{n-1}|$, that is, when step S1003 is NO, it is judged that the object has deviated from the detection field, in order to prevent judging by mistake that there is a movement of the object, and the ordinary intermittent drive (convergence drive) without pursuit correction is effected.

Step S1004 will now be described. The purpose of this step is to eliminate the possibility that when the lens is in the vicinity of in-focus and there is no movement of the object (or if there is any movement of the object, it is small), the relative rate of the defocus amount detection error included in the amount of convergence deficiency $P_n$ increases and the judgment at step S1002 is affected by the detection error irrespective of whether there is any movement of the object, and to prevent the drive from having a touch of hunting just before convergence when there is no movement of the object. To realize this purpose, there is provided an allowance range $\delta_a$ and when $|P_n|$ is not $|P_n| > \delta_a$, it is judged that there is no movement of the object. The magnitude of $\delta_a$ is determined as a value which reflects the defocus amount calculation error and the magnitude of the depth of field, and is generally a value of the order of 0.05–0.2 mm. When the lens is approximate to the vicinity of in-focus and $P_n$ is within a range which can be generally regarded as the vicinity of in-focus, only the convergence drive which is not the pursuit driving is effected. By this step, it is impossible to detect the movement of the object when the movement is small, but in such case, even the ordinary intermittent drive (convergence drive) without pursuit does not provide a substantial pursuit and therefore, there is no problem. This step S1004 is not limited to this position, but may be placed before step S1001.

As described above, according to the second embodiment, the judgment of the movement of the object becomes more complete and therefore, there is no problem of hunting during the usual operation which would otherwise result from the addition of the pursuit software, and a stable operation is ensured. Again in the second embodiment, as in the first embodiment, measurement of time is not effected and therefore, any situation can be coped with by very simple software processing.

[Third Embodiment]

While the timing determined by only the operational characteristics of the focus detecting means and lens driving means has so far been discussed, it is necessary to consider the timing with exposure when the camera is considered as a premise. The drive described in the first and second embodiments is the intermittent drive, and the drive itself is stepwise. In contrast, the movement of the object changes smoothly and therefore, it is preferable to provide the timing of exposure appropriately. Conversely speaking, even though stepwise pursuit is provided because the pursuit driving is intermittent drive, if the timing of exposure is appropriate, there will be obtained a photograph that is completely in focus. How to provide such timing of exposure will hereinafter be described in the following third embodiment. It should be noted that the pursuit system in the third embodiment presupposes the pursuit system of the first and second embodiments. Also, as regards the shutter release, there are the independent mode in which exposure (mirror-up) is permitted independently of the presence or absence of the judgment of the in-focus state of the focus detecting system and the in-focus priority mode in which exposure is permitted when there is the judgment of the in-focus state but herein, description will be given with the in-focus priority mode in mind.

Before the third embodiment is described specifically, how to provide the timing of exposure in the known ordinary intermittent drive system will be described with reference to FIG. 8.

When the defocus amount is calculated at step S5, the magnitude of the defocus amount is compared with a predetermined in-focus range $\delta$ at step S81, and if the magnitude of the defocus amount is greater than $\delta$, the lens is driven at step S10$a$ (FIG. 6B), and when it is judged at step S10$b$ that a predetermined amount of drive has been terminated, the next charge storage is started. This cycle is effected one to three times and, when by the judgment at step S81, it has been found that the magnitude of the defocus amount is smaller than $\delta$, advance is made to step S82, where the in-focus operation is performed. When the defocus amount is greater than $\delta$, shift is made to the step S10$a$ of FIG. 6B. However, the defocus amount here is not $D_n'$ but $D_n$. The in-focus operation referred to herein means permitting the mirror-up for the turn-on of the display of in-focus and the exposure of the film, and even if the shutter release has been effected before this, exposure is not effected until this point of time, but the mirror-up and exposure are effected in response to a signal indicative of exposure permission. This is the gist of the in-focus priority mode. In the ordinary case where there is no movement of the object, there is no problem in this processing. However, when the object is moving, the above-described ordinary processing suffers from the disadvantage that exposure is effected at a location which is out of focus. This will hereinafter be described with reference to FIG. 9.

Figure 8:
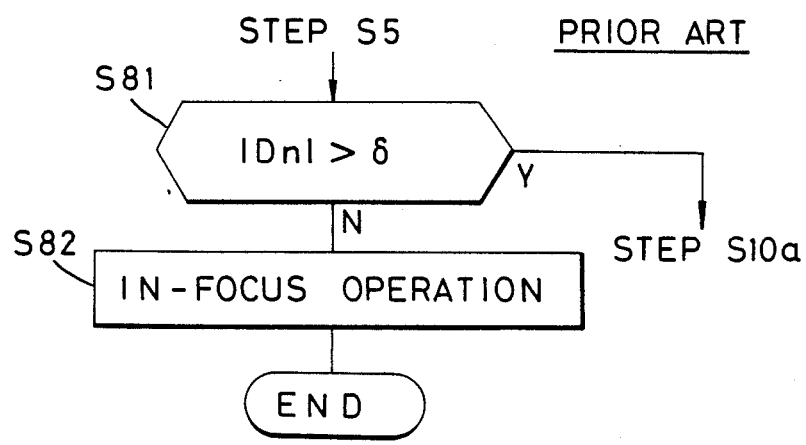
FIG. 8 illustrates the timing of exposure in the well-known ordinary intermittent drive system.
Figure 9:
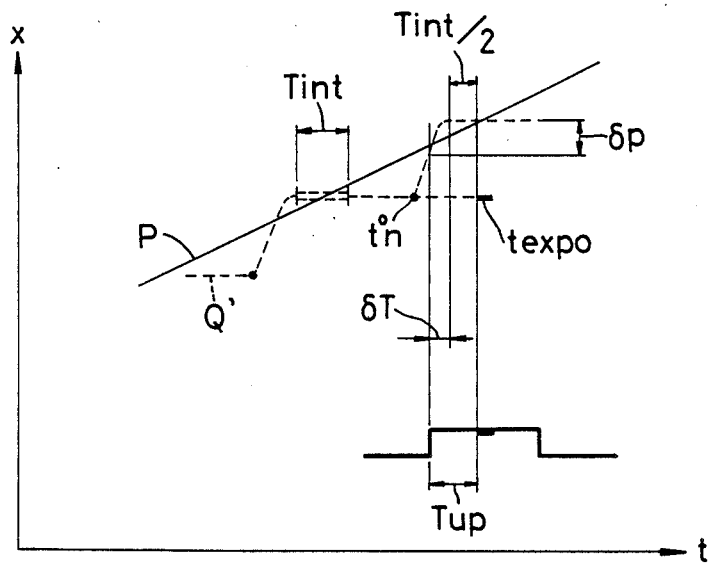
FIG. 9 is a graph showing the manner of the in-focus operation of the automatic focus adjusting apparatus in the intermittent drive system of FIG. 8.

In the example shown in FIG. 9, the locus P of the image passes the midpoint of the charge storage time Tint and therefore, the defocus amount $D_n$ calculated at the end $t_n$· of the operation is $|D_n|<\delta$, and the in-focus operation routine of the step S82 of FIG. 8 is entered. If the shutter release has been effected before $t_n$·, the exposure permission (the mirror-up permission by step S82) occurs at the point of time $t_n$·, and the mirror-up is effected and exposure of the film takes place at time $t_{expo}$ after a delay time Tup resulting from the mirror-up. However, at this point of time, as is apparent from FIG. 9, the locus P of the image is far from the aforementioned midpoint and thus, a photograph which is out of focus is taken. That is, $|D_n|<\delta$ merely means the in-focus at the midpoint of the charge storage time and thus, the image surface deviates by an amount corresponding to the delay time from this moment till the exposure.

Figure 10:
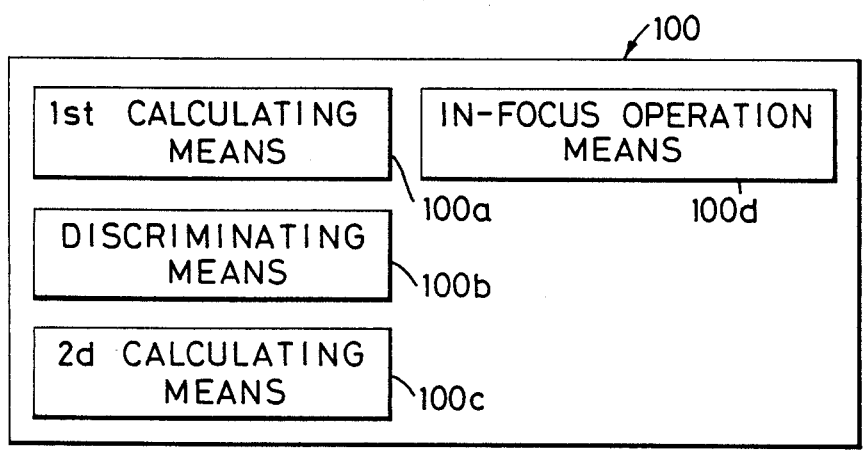
FIG. 10 is a block diagram of the correcting means of an automatic focus adjusting apparatus which is a third embodiment of the present invention.

To solve this problem, in the third embodiment, in-focus operation means 100$d$ is provided in the main correcting means 100 as shown in FIG. 10 so that during the pursuit drive, an in-focus operation best suited therefor may be performed therein. The operation of this means 100$d$ will hereinafter be described with reference to the flow charts of FIGS. 11A, 11B and 11C.

Figure 11A:
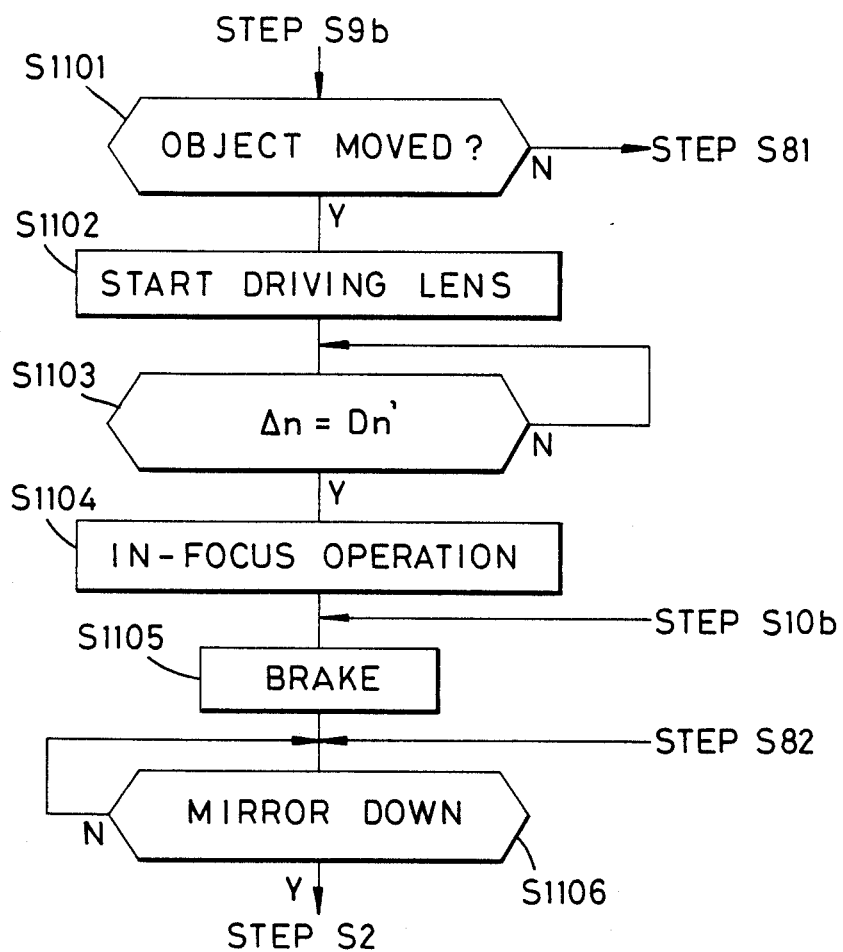
FIGS. 11A, 11B and 11C are flow charts of the automatic focus adjusting apparatus of FIG. 10.

At the step S1101 of FIG. 11A, whether there is any movement of the object is discriminated on the basis of the result of step S7 (FIG. 6B), and if there is no movement of the object, advance is made to step S81 and S82. These steps correspond to the steps of the same numbers in FIG. 8 and therefore need not be described. When it is judged at step S1101 that there is a movement of the object, drive is started at step S1102 and, when a predetermined drive stop condition is satisfied at step S1103, advance is made to step S1104, where the in-focus operation II is performed.

The substance of the in-focus operation of step S1104 is equal to the substance of the in-focus operation of step S82 and is the exposure permission and the turn-on of the display, but in this case, the object is moving and therefore, it is preferable that the display be turned off after the lapse of a predetermined time.

The reason why, by doing so, a photograph which is in focus can be taken even when there is a movement of the object will now be described with reference to FIG. 9.

According to the pursuit driving method in the first and second embodiments, control is effected such that during the pursuit, the locuses P and Q' substantially intersect each other at the moment regarding the midpoint of the charge storage time Tint.

From this, it is anticipated that if the cycle time is the same, the next intersection between the locuses P and Q' will occur in a time Tint/2 after the termination of the drive.

On the other hand, if the delay from the start of the mirror-up till the exposure is Tup and the time difference therebetween is $\delta T$, $\delta T = Tup - Tint/2$.

Accordingly, if the drive is terminated and the mirror-up is effected $\delta T$ before the timing at which the resumption of the storage was to be directed, it will be possible to lie substantially near the point of intersection between the locuses P and Q' at the moment of exposure.

Incidentally, in the case of a camera body in which Tup$\approx$50 m sec, Tint/2 varies in conformity with the light and shade of the object, but it is 0–50 m sec in almost all cases except the case where the object is very dark and therefore, $0 \leq \delta T \leq 50$ m sec and thus, the mirror-up can be effected earlier by 20–30 m sec than the timing at which the resumption of the storage is scheduled.

As a first example of the manner in which timing is taken, in a case where it takes about 20 m sec from after the brake is applied to stop the lens driving until the lens is completely stopped and the image surface moves by about 50$\mu$ in the meantime, it is possible to adjust the timing of the mirror-up to the timing at which the brake is applied, and set the timing so as to take the timing of the resumption of the storage in 20–30 m sec thereafter. As a second example of the manner in which timing is taken, if it is assumed that 20–30 m sec is required for the remaining drive amount to change from 150$\mu$ to 50$\mu$ as converted in terms of the movement of the image surface, the purpose can also be achieved by making design such that the timing of the mirror-up is put out at a point of time whereat the remaining drive amount is 150$\mu$ and the timing of the application of the brake and the resumption of the storage is put out at a point of time whereat the remaining drive amount is 50$\mu$.

Figure 11B:
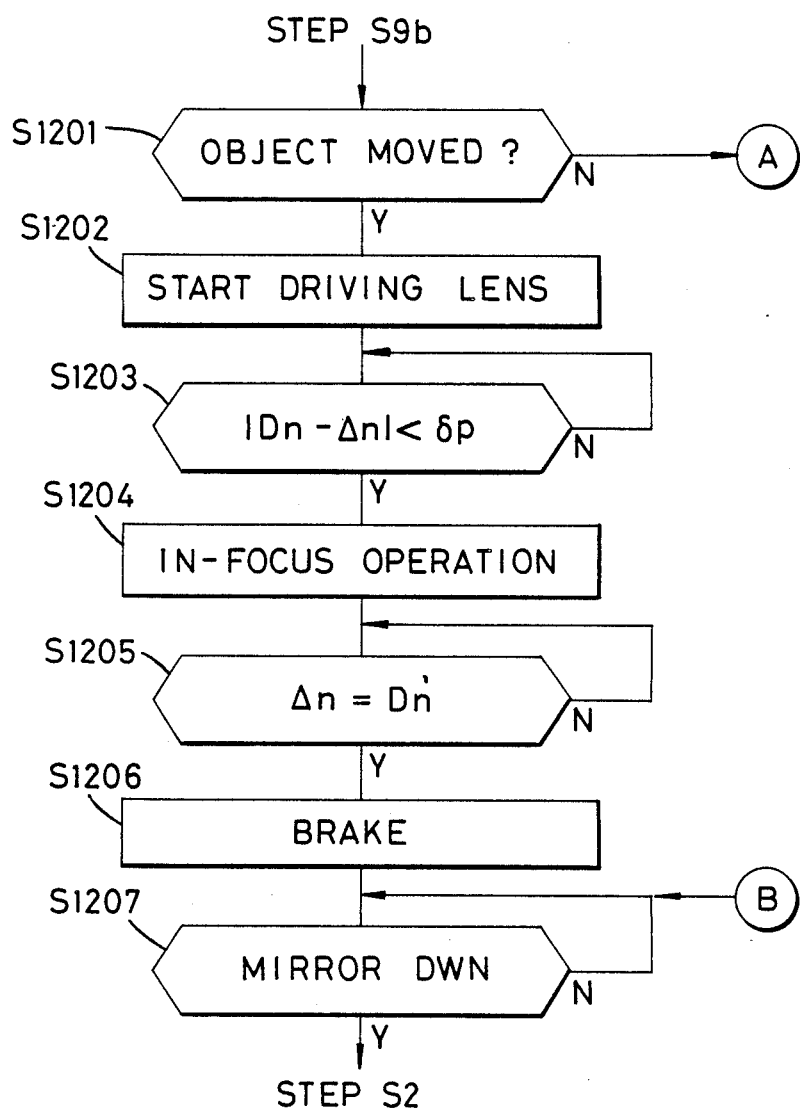
Figure 11C:
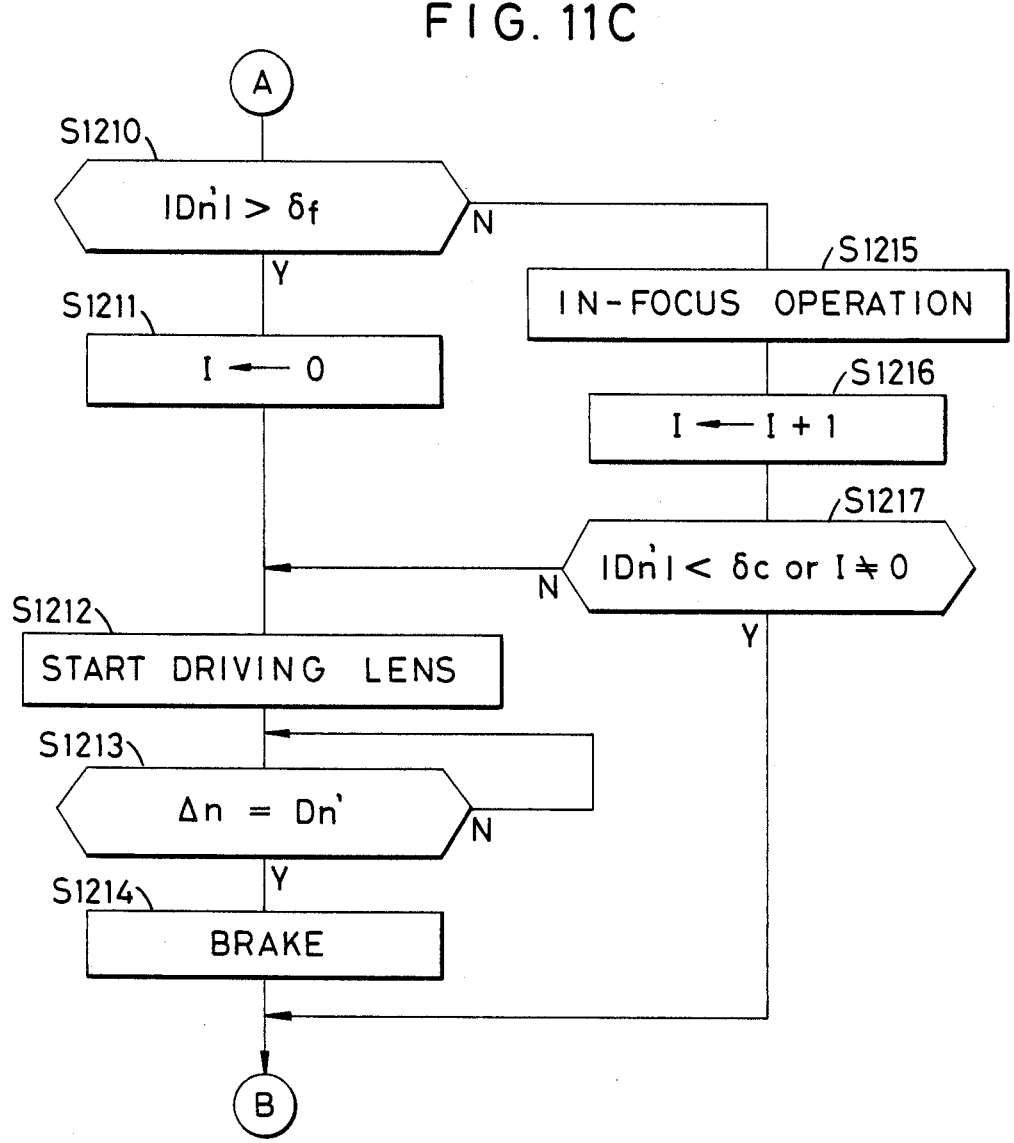

The case of the second example will now be described with reference to FIGS. 11B and 11C.

When there is a movement of the object, shift is made from step S1201 to step S1202, where the lens driving is started. It is to be understood that the values of $\delta_p$ and $\delta_o$ are determined so that the time required for the remaining drive amount to change from $\delta_p$ to $\delta_o$ with respect to the movement of the image surface is approximately $\delta T$. When at step S1203, the remaining drive amount is below $\delta_p$ with respect to the movement of the image surface, advance is made to step S1204, where the in-focus operation including the mirror-up permission is performed. Of course, unless the shutter release has been done by this point of time, the mirror-up is not executed even if the mirror-up permission is put out. If the drive progresses further and the drive stop condition of step S1205 is satisfied, that is, if the amount of movement of the image surface corresponding to the remaining drive amount is below $\delta_o$, the brake is applied at step S1206 and it is confirmed at step S1207 that the main mirror is in the mirror-down state, and when the main mirror is in the mirror-down state, return is made to the step S2 of FIG. 6A, where the storage is resumed. When the shutter button is in its released state in advance and the mirror-up is actually effected in response to the mirror-up permission at step S1204, it is judged at step S1207 that the main mirror is not in the mirror-down state and therefore, the program stays at step S1207 until exposure is terminated and the main mirror returns to the mirror-down state, and with the mirror-down, shift is made to the step S2 of FIG. 6A, where the storage is resumed.

Now, the value $\delta_p$ at step S1203 may be set to a predetermined value, but it will be perfect if the charge storage time is monitored and $\delta T$ corresponding thereto is calculated and the value of $\delta_p$ is changed in conformity with the value of $\delta T$.

While the case where $\delta T > 0$ has been described above, there is the possibility that depending on the conditions, a case where $\delta T < 0$ may also occur. In such case, however, the timing of the mirror-up is in the direction in which it is delayed with respect to the timing of the termination of the drive and can therefore simply be delayed with the time $\delta T$ counted from the timing of the termination of the drive.

In the foregoing, the method of compensating for the error of $\delta T$ has been strictly described, but in a case where $\delta T$ is almost always 20-30 m sec, there will be obtained a substantially satisfactory result even if the timing of the in-focus operation (the mirror up permission) and the timing at which the resumption of the storage is directed are not intentionally deviated from each other.

Description will now be given of a case where it is judged at step S1201 (FIG. 11C) that there is no movement of the object. In such case, the magnitudes of $|D_{n'}|$ and $\delta_f$ are compared at step S1210. There is no pursuit in this loop and therefore, $D_{n'} = D_n$. Here, $\delta_f$ represents the width of one side of the in-focus zone and is an amount of the order of 50-200µ. If $|D_{n'}| > \delta_f$, the discrimination flag I is set to O at step S1211, and the drive is started at step S1212. Then, the brake is applied at step S1214 where the drive stop condition at step S1213 is satisfied, and past the step S1207, the storage is resumed at step S2. In this manner, return is again made to step S1210 and, when $|D_{n'}| < \delta_f$, advance is made to step S1215. At step S1215, the in-focus operation including the turn-on of the display and the mirror-up permission is performed. Then at step S1216, 1 is added to the discrimination flag I and it is memorized that the in-focus zone has been entered. At step S1217, whether $|D_{n'}| < \delta_c (0 < \delta_c < \delta_f)$ or $I > 1$ is examined, and when these conditions are satisfied, the drive is not effected but shift is made to the next storage. Here, $\delta_c$ is a value of the order of 0-50µ and is a threshold value provided to stop the lens near the center of the in-focus zone. If at step S1217, the conditions are not satisfied, that is, $I = 0$ and $\delta_f > |D_{n'}| > \delta_c$, the drive is started at step S1212 and the lens is driven until the drive stop condition remaining drive amount becomes greater than $\delta_c$, and then the brake is applied at step S1214.

The essential point of the above-described third embodiment may simply be briefed as follows. With respect to a case where at least the calculated drive amount exceeds a predetermined value (a value of the order of 50-150µ), the in-focus accomplishing means does not perform the in-focus operation when there is no movement of the object, whereas with respect to a case where it is judged that there is a movement of the object, the in-focus accomplishing means performs the in-focus operation after or just before the termination of the pursuit driving.

Thus, in the third embodiment, the timing of the in-focus operation, i.e., the turn-on of the display of the in-focus and the occurrence of the mirror-up permission, is changed between the case where there is the pursuit driving and the case where there is no pursuit driving, whereby even when there is the pursuit driving, exposure can be accomplished at the most effective moment thereof, and in spite of the pursuit by the intermittent drive, it becomes possible to take a photograph which is completely in focus to the moving object.

Again in the third embodiment, measurement of time is not always necessary and if used, it is the value of the charge storage time. This value is indispensable even in the ordinary focus detecting device free of pursuit when the storage time is controlled by software and therefore, it is often the case that this value is measured. It will suffice if it is diverted, and in that case, the burden in terms of the software does not particularly increase. Since the third embodiment is similar to the previous embodiments in that it adopts the intermittent drive, multi-task is not encountered as is in the case of Japanese Laid-Open Patent Application No. 214325/1985, and the ease of the preparation of software as described in connection with the first embodiment is not lost.

[Fourth Embodiment]

In the above third embodiment, a description has been given of how to provide the timing of exposure. However, it is only the timing of the first exposure to which the foregoing description applies, and it is necessary to pay attention to the fact that the timing of the second and subsequent exposures when continuous photography is effected differs. That is, until before the first exposure, the storage, calculation and drive are repeated as one cycle and accordingly, it has been sufficient if the timing of exposure is provided on such a premise. In addition, it has been sufficient if consideration is given to the coincidence in timing between the moment of the first exposure and the moment which provides the midpoint of the predetermined storage time.

However, as regards the second and subsequent exposures in the continuous photography mode, it is necessary to consider a repeated operation in which the storage, calculation, drive and mirror-up period are one cycle, and the moment of exposure exists at the middle of the mirror-up period and therefore, it is impossible to make the middle of the storage time and the moment of exposure coincident with each other.

Figure 12:
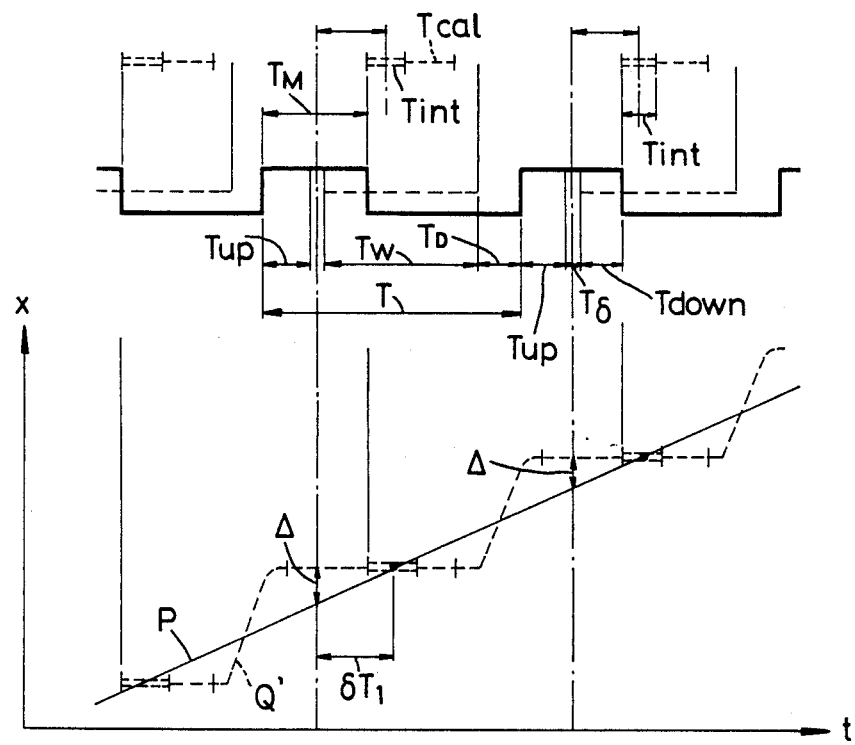
FIG. 12 is a graph showing the timing during continuous photography by the motor drive device of the automatic focus adjusting apparatus according to the pursuit driving system of the first embodiment.

The pursuit system in such a case will now be described as a fourth embodiment. Again in such case, the basic operation of pursuit presupposes the first and second embodiments. The upper portion of FIG. 12 shows the timing of each operation during continuous photography by the motor drive. The period of the continuous photography is T, of which the period during which the mirror is up is $T_M$. The mirror-up period $T_M$ is comprised of a delay time Tup accompanying the mirror-up, an exposure time Ts and a delay time $T_{down}$ accompanying the mirror-down. Also, the period $T_W$ indicated by broken line in FIG. 12 is a period corresponding to the film advance after the exposure. Also, the time from the end of the film advance or the end of the calculation till the start of the mirror-up is $T_D$, during which the lens driving is effected. The timing of the start of the mirror-up, as previously described, is the time when the remaining amount of drive has become a predetermined amount (e.g. 50µ or 150µ) as converted into the amount of movement of the image surface.

Now, in the case of the construction of FIG. 3, focus detection cannot be effected in a state in which the mirror is up and therefore, storage is started simultaneously with the mirror-down, and as shown in FIG. 12, the defocus amount is found at a point of time whereat the storage time Tint and the calculation time Tcal have elapsed. Where the lens driving is inhibited during the film advance, the start of the lens driving will be delayed until the termination of the film advance even if the defocus amount is calculated.

Under the continuous photography conditions at and after the termination of the first exposure difference of $T_1 = T_{down} - T_{int}/2$ between the timing of the exposure and the timing of the middle point of time of the integration time.

Now, as previously described, according to the pursuit driving method described in connection with the first embodiment, corrective drive for pursuit is effected so that as shown in FIG. 12, P and Q' intersect each other at the midpoint of the storage time. However, in this state, the drive is intermittent and therefore, at the timing of the exposure, a photograph which is out of focus by an amount Δ by which the object image surface has moved during $\delta T_1$ is taken.

Figure 13:
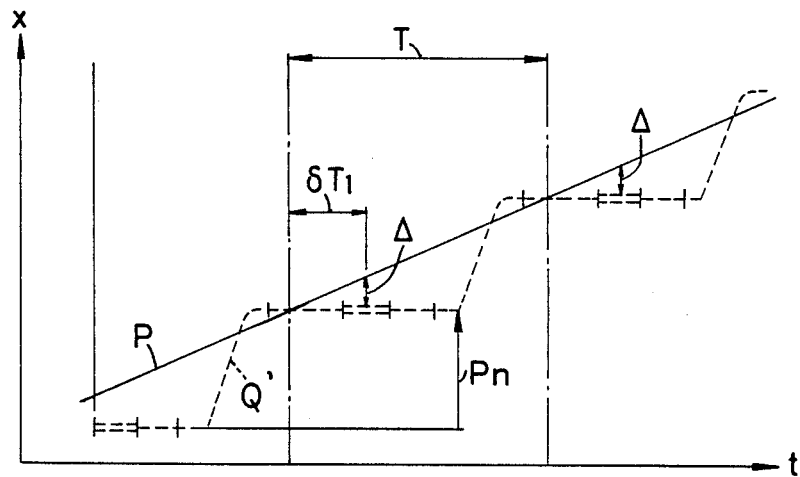
FIG. 13 is a graph showing the timing during said continuous photography of an automatic focus adjusting apparatus which is a fourth embodiment of the present invention.
Figure 14:
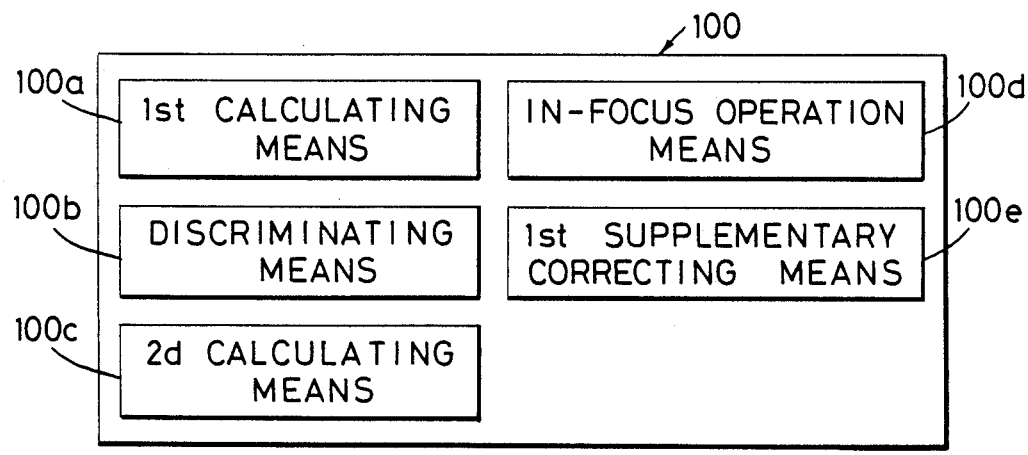
FIG. 14 is a block diagram of the correcting means of said automatic focus adjusting apparatus.

The fourth embodiment takes into account the out-of-focus Δ based on the deviation $\delta T_1$ between the timing of the exposure and the timing of the midpoint of the storage time, and provides in said main correcting means 100 first supplementary correcting means 100e for correcting the out-of-focus Δ as an amount of excessive convergence deficiency, as shown in FIG. 14, so that even when a moving object is to be continuously photographed, a photograph which is in focus can be taken while the moving object is pursued. That is, the fourth embodiment decreases the amount of correcting drive for pursuit by Δ, thereby controlling the pursuit driving so that P and Q' overlap each other at the timing of the exposure, as shown in FIG. 13.

A method of calculating Δ will now be described.

As can be seen from FIG. 13, Δ is given by $\Delta = P_n \cdot \delta T_1/T$ and therefore, if the cycle time T and the storage time $T_{int}$ are pre-counted, Δ can be determined accurately. However, since both $T_1$ and T are limited in the ranges of values which they may usually assume, there will not occur a great error even if Δ is calculated on the basis of $\Delta = P_n \cdot \alpha$ with $\alpha(=\delta T_1/T)$ as a suitable constant. In this case, there is a merit that $\delta T_1$ and T need not be counted.

The value of said constant $\alpha$ is within the range of $0.1 \leq \alpha \leq 0.5$ and often is of the order of 0.2. Also, actually, the locus of the object image surface depicted by P in FIG. 13 is not a straight line, but when the object comes near, the inclination increases with time, and when the object becomes more distant, the inclination decreases with time, and therefore it is preferable to discriminate the direction of movement of the object by the sign of $P_n$ and thereby change the value of $\alpha$. That is, if $\alpha$ when the object becomes more distant is $\alpha_f$ and $\alpha$ when the object comes near is $\alpha_n$, the design is made such that of $\alpha_f > \alpha_n$. If this is done, the value of Δ when the object becomes more distant will become greater and the amount of corrective drive for pursuit will decrease and can be made coincident with the decrease in the inclination of the locus of the object.

Figure 15:
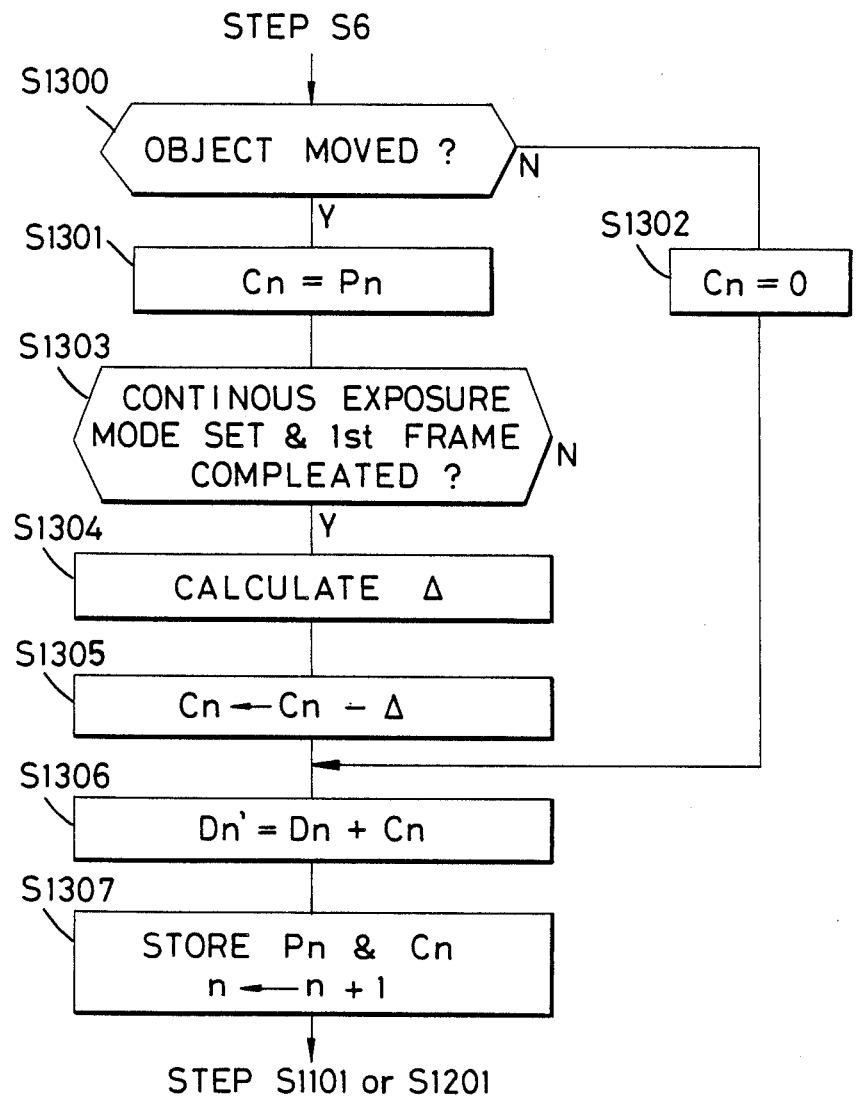
FIG. 15 is a flow chart of said automatic focus adjusting apparatus.

The correction procedure will now be described specifically with reference to FIG. 15.

Up to step S6 the procedure is as described in detail in connection with the first and second embodiments. At step S1303, the continuous exposure mode is set and whether the first exposure has been completed is examined. In other words, whether there has been mirror-up or mirror-down between the final lens driving operation and the current storage calculation cycle is examined. The first exposure is effected at the timing based on the third embodiment and therefore, correction of the amount of excessive convergence deficiency Δ is not effected and accordingly, shift is immediately made to step S1306. During the continuous exposure, the aforementioned amount of excessive convergence deficiency Δ is calculated at step S1304, and at step S1305, the amount of corrective drive $C_n$ resulting from the amount of corrective drive $C_n$ for pursuit having further been corrected by said Δ is calculated, and then shift is made to the next step S1306. As regards this step and subsequent steps, shift is made to step S1101 of FIG. 11A or step S1201 of FIG. 11B. Here, it is to be understood that when the fluctuation of Tint is taken into consideration in the calculation of Δ, the start and termination of the operation of the internal timer are controlled at steps S2 and S3 to find Tint and calculation of Δ is effected on the basis of the result thereof.

As described above, according to the fourth embodiment, the movement of the object image surface corresponding to the time difference between the moment of the exposure and the time which provides the midpoint of the storage time can be corrected and therefore, even during continuous exposure, a photograph which is in focus is taken for a moving object. Also, again in this embodiment, intermittent drive is basically adopted and therefore, the CPU need not to effect multi-task such as storage calculation and parallel processing of drive, and construction of software is easy.

As described above in the third and fourth embodiments, the optimum control conditions differ between the first exposure during the continuous exposure by the motor drive and the second or subsequent exposure. Accordingly, the correcting means needs to effect optimum control with this point discriminated.

[Fifth Embodiment]

In the above-described third and fourth embodiments, the in-focus priority mode has been the premise. That is, even when shutter release has been effected, mirror-up has not been effected until the signal of exposure permission has been put out from the focus detecting system. Simultaneously with or just before the termination of the pursuit driving, the signal of mirror-up permission has been put out and along therewith, mirror-up has been effected.

However, this suffers from the disadvantage that a photograph at an intended moment cannot always be taken. So, there is conceived an independent mode in which the in-focus conditions are made more or less mild, mirror-up is effected and exposure is effected at the moment when the shutter release button has been depressed. In a fifth embodiment, a description will be given of conditions for enabling photographs which are in focus as much as possible to be taken in such an independent mode.

It is sometimes the case with the motor drive of a single-lens reflex camera that the highest frame speed is of the order of 5 frames/sec. The timing in such a case will be described with reference to the upper stage of FIG. 16. The cycle time T of continuous exposure is 200 m sec, of which the mirror-up time $T_{up}$ is 50 m sec. Assuming that the exposure time is 20 m sec and the film advance time $T_w$ which starts after the termination of the exposure is 100 m sec, the remaining time $T_D$ is only of the order of 30 m sec.

If the time from the application of the brake until the motor is stopped is estimated at 10-20 m sec, the net driving time is 10-20 m sec and the lens driving becomes substantially impossible.

Accordingly, in order that the in-focus operation may be able to match a high-speed motor drive as much as possible, it is preferable to permit the lens driving even during the period $T_{up}$ from the mirror-up till just before the exposure. If $T_{up} \approx 50$ m sec, the time usable for the lens driving is given by the order of $T_D + T_{up} \approx 80$ m sec and therefore, in most cases, the amount of drive necessary for pursuit can be covered. Accordingly, in order that high-speed response may be accomplished as much as possible, it is important to effect the lens driving even during the period $T_{up}$.

Now, it is apparent from the premise that in the case of the in-focus priority mode, the focus detecting system and the timing of the exposure are in a predetermined relation, but also in the case of the independent mode in which exposure is effected in response to the depression of the shutter release button independently of the state of the focus detecting system, there is really created a predetermined relation between the timing of the operation of the focus detecting system and the timing of the exposure. Thus, even in the independent mode, it is possible to control the focus state so as to become approximately correct at the moment of the exposure. That is, the above-mentioned predetermined relation is necessarily created by providing the condition that the charge storage shall be started as soon as the main mirror has been completely lowered. By such conditioning, the same parameter $\delta T_1$ as that described in the fourth embodiment acquires a meaning. That is, when there is mirror-up or mirror-down between the final lens driving operation and the current storage and calculation cycle, the time difference between the moment of the exposure and the midpoint of the current storage time is $\delta T_1$.

Thus, it is seen that except for the fact that the lens driving time includes Tup, the same processing as that described in the fourth embodiment is effective again in the fifth embodiment. So, a description will now be given of the influence of the fact that the lens driving time includes Tup.

First, assuming that the amount of movement over which the image surface can be moved by the lens driving for the time $\delta T_1$ is $\Delta Z_1$, it is possible to pursue a moving object equivalent to $5 \times \Delta Z_1$/sec as the movement speed of the object image surface, and to increase this ability, it is necessary to increase the power of drive so that the above-mentioned relation can be satisfied.

Figure 16:
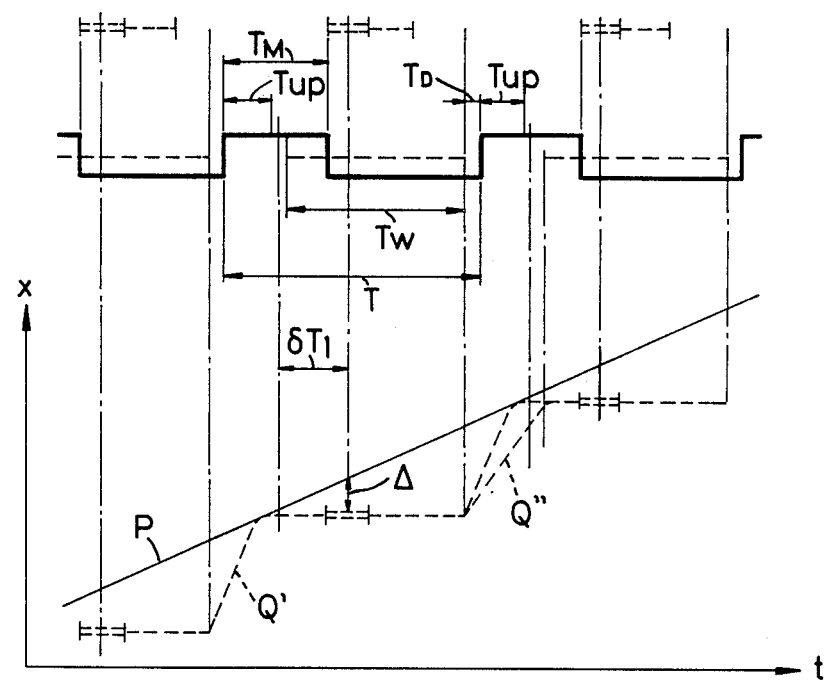
FIG. 16 is a graph showing the timing during photography of an automatic focus adjusting apparatus which is a fifth embodiment of the present invention.

In FIG. 16, Q' depicts an example of the case which just corresponds to such a critical condition, and the lens is stopped with the brake applied immediately before the exposure. Also, when said critical condition is slightly exceeded, there occurs a state in which the lens is still moving even during the exposure as indicated by Q", but in such a case, the image surface is moving quite rapidly and therefore, there is no point in stopping the lens strictly, and slight movement of the lens will pose no problem. Further, when the movement of the object is great to such a degree as to exceed said critical condition by far, the pursuit will unavoidably be follow-up.

As described above, according to the fifth embodiment, the lens driving is permitted even after mirror-up, thereby enabling a photograph which is in focus to be taken in both of the case of the independent mode and the case of the high-speed motor drive. Again in this case, it is to be understood that the first supplementary correcting means 100e determines $\Delta$ in the same manner as described in the fourth embodiment and corrects the amount of excessive convergence deficiency. Of course, also in the in-focus priority mode of the fourth embodiment, it is possible to positively effect the lens driving during the period Tup and increase the responsiveness by choosing $\delta_p$ to a great value.

[Sixth Embodiment]

In the foregoing embodiments, a description has been given of the pursuit driving system in which measurement of time is not always necessary and if necessary, it can be approximated for by a representative value.

Also, the case where the storage time and the calculation time are substantially equal has been supposed. In fact, during the pursuit, the same object is pursued and therefore, said condition is substantially satisfied. Also, according to simulation, it has been found that even if there is slight irregularity, a touch of overrun or underrun will correspondingly be experienced at each time, but as a whole, sufficiently effective pursuit driving will be effected as compared with the ordinary intermittent drive.

Figure 17:
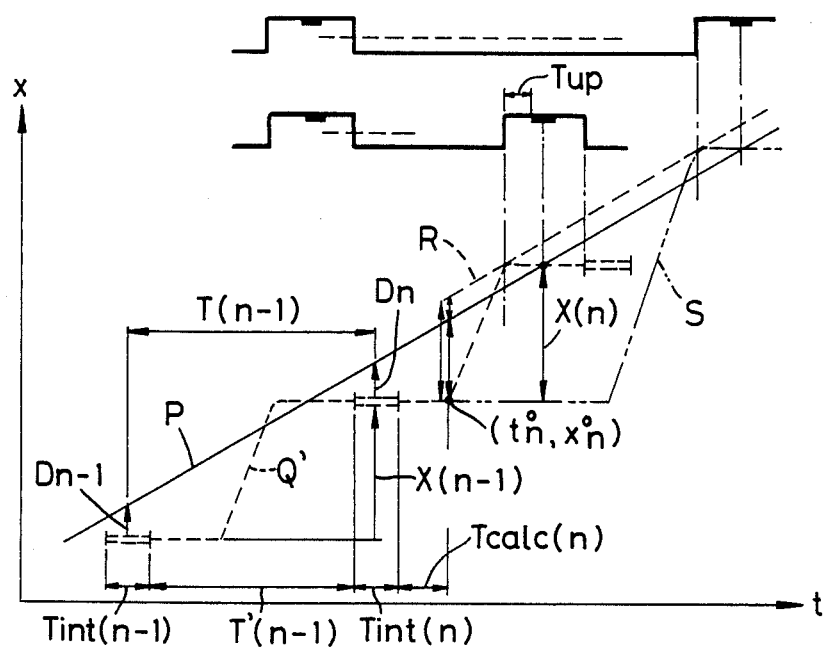
FIG. 17 is a graph showing the timing during photography of an automatic focus adjusting apparatus which is a sixth embodiment of the present invention.
Figure 18:
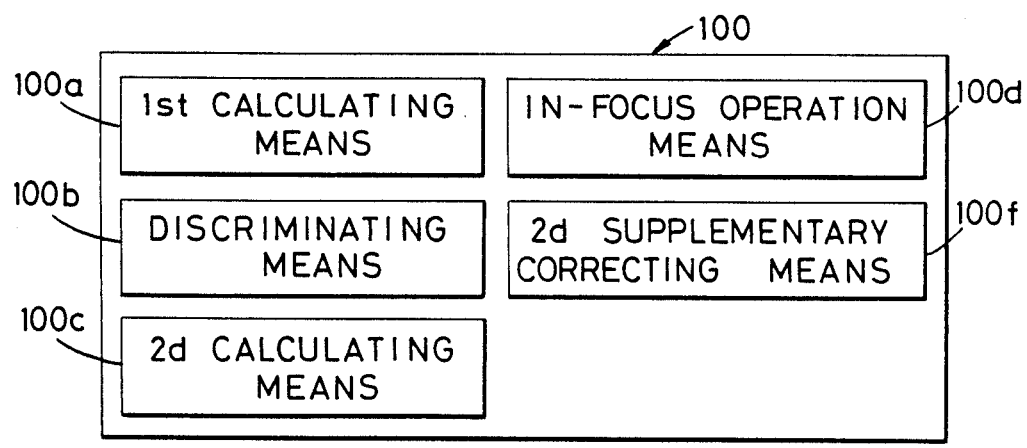
FIG. 18 is a block diagram of the correcting means of said automatic focus adjusting apparatus.

However, if the pursuit software is constructed with the irregularity of the time interval taken into account, it is possible to eliminate even said slight overrun and underrun, and such a case will be described in the following sixth embodiment. In the previous embodiments, the object movement correction amount $P_n$ during one period has been intactly used in the calculation, whereas in the present embodiment, as shown in FIG. 17, the time $T(n-1)$ is measured to calculate what corresponds to the speed of movement of the object, whereby correction of the pursuit driving is finely effected by second supplementary correcting means 100f included in the main correcting means 100 of FIG. 18, but the present embodiment is similar to the previous embodiments in that no drive is effected during the storage calculation and intermittent drive is essentially adopted.

Figure 19A:
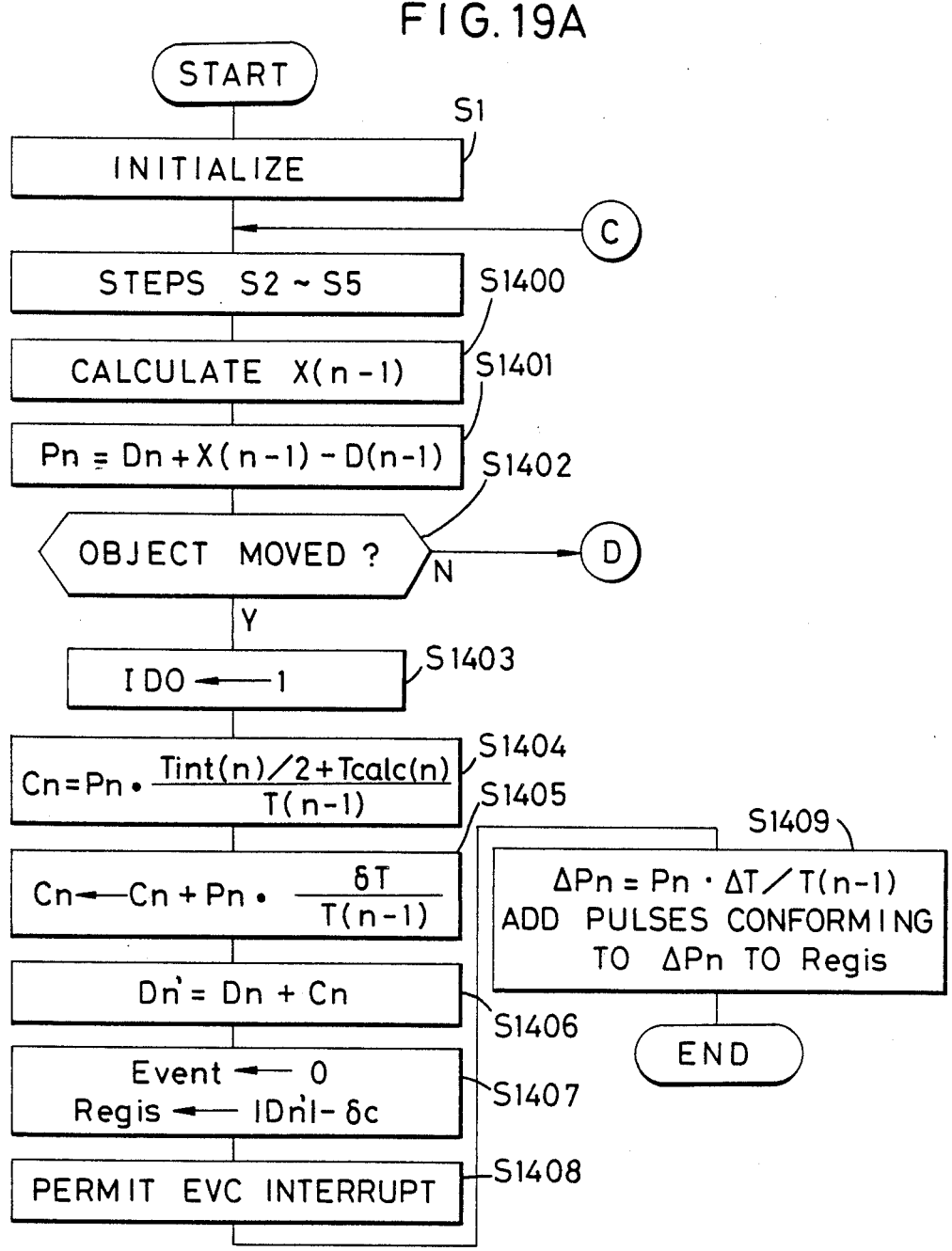
FIGS. 19A, 19B and 19C are flow charts of the automatic focus adjusting apparatus of FIG. 18.
Figure 19B:
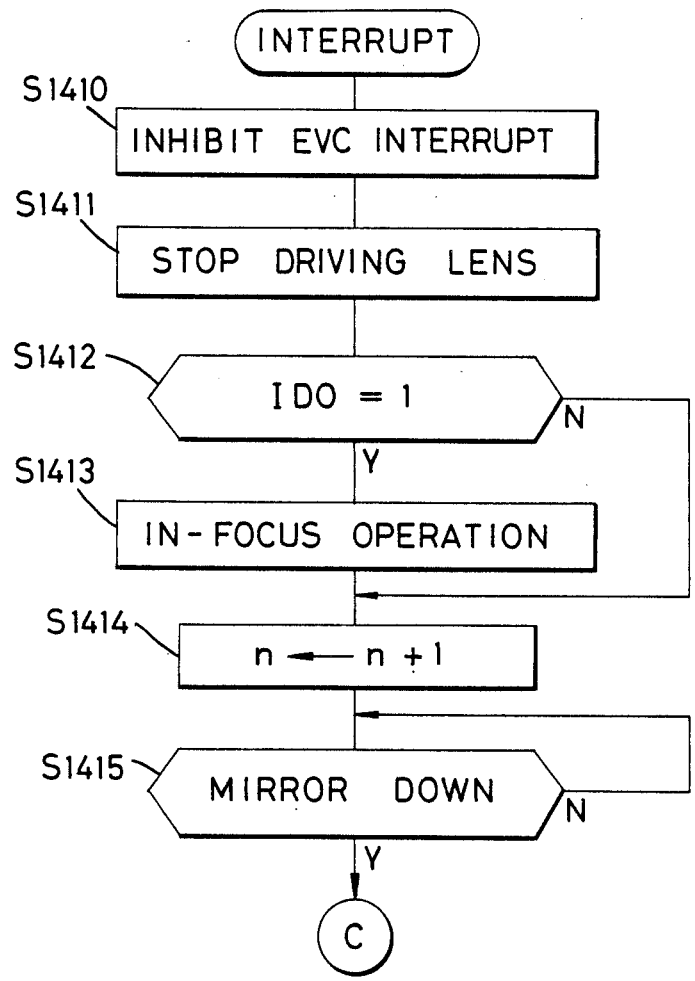
Figure 19C:
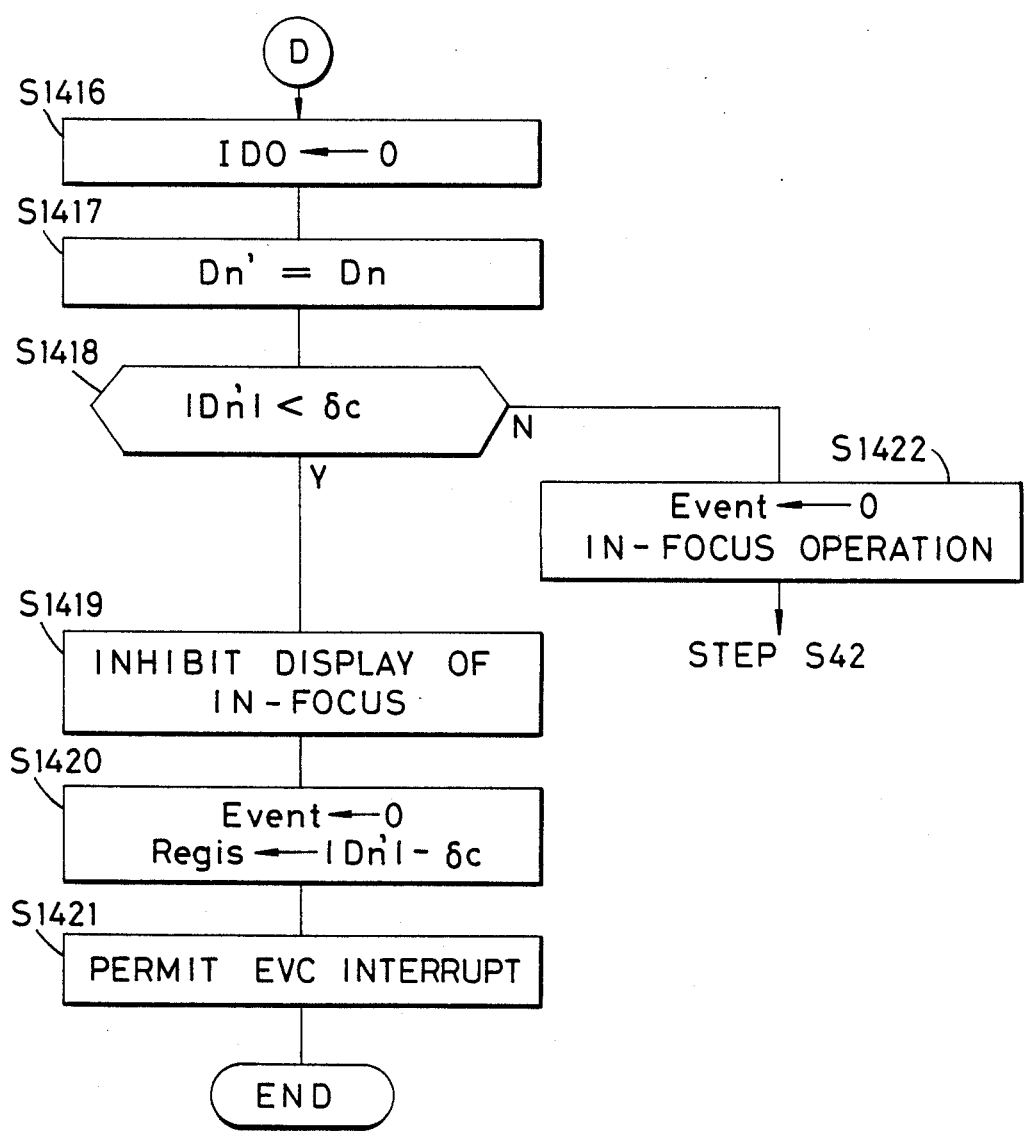

The flow of processing will hereinafter be described with reference to the flow charts of FIG. 19A, 19B and 19C. Steps S2–S5 are similar to those of FIG. 6B. At the next step S1400, the drive amount X(n−1) is calculated from the value Event of the event counter or the value Regis of the register.

The event counter contains therein the result of the counting of the feedback pulse regarding the last drive from monitor means.

At step S1401, the first calculating means 100a calculates the amount of convergence deficiency Pn by $Pn=Dn+X(n-1)$ from equation (1).

At step S1402, whether there is any movement of the object is discriminated by the object movement discriminating means 100b. The specific method is as described in the first and second embodiments. If there is a movement of the object, advance is made to step S1403, where flag IDO is set to IDO=1. Steps S1404 and S1405 correspond to the content of the second calculating means 100C in this embodiment. Step S1404 calculates, by the following equation, an amount corresponding to the difference between P and Q' of FIG. 17 at the point of time whereat the calculation has been terminated, as the correction amount:

$$Cn=Pn\cdot\{Tint(n)/2+Tcalc(n)\}/T(n-1) \quad (3)$$

Step S1405 is for effecting the processing which corresponds to what has been described in the third embodiment and the fourth embodiment, and in order to optimize the timing of the exposure, it further effects the following correction:

$$Pn\cdot\delta T/T(n-1) \quad (4)$$

where $\delta T$ is an amount which depends on the timing of the exposure. $\delta T$ is calculated from $\delta T=Tup-Tint(n)/2$. Tint(n), as described in connection with FIG. 15, is counted by the internal counter each time charge is stored, and Tcalc(n) is likewise counted from the termination of the charge storage till the start of the lens driving by the use of another internal timer.

At step S1406, the drive amount Dn' is found as the sum of the defocus amount Dn and the drive amount Cn for pursuit.

Now, it is to be understood that the lens driving is automatically started by setting a pulse number corresponding to the drive amount in the register Regis and the feedback pulse output from the monitor means 103 along therewith is counted by the event counter and interrupt occurs at a point of time whereat the total value of the event counter becomes equal to the value set in the register Regis (hereinafter this interrupt will be referred to as the EVC interrupt). Here, with regard to the direction of drive, a flag is provided discretely and the direction of revolution of the lens driving motor is controlled by this flag, but it need not be described in the flow chart.

At step S1407, the event counter value Event is set to O, and a pulse number corresponding to $(|D_{n'}|-\delta c)$ is set in the register Regis.

Thereby the lens driving is automatically started.

Then at step S1408, the EVC interrupt is permitted and the interrupt of stoppage is waited for. Step S1409 corresponds to the second supplementary correcting means 100f of FIG. 18, and the correction amount calculated at step S1404 has been that at the point of time whereat the calculation has been terminated and therefore, the correction amounts after this point of time are successively corrected.

The amount of movement of the object image surface is given during the time $\Delta T$ by the following equation:

$$\Delta P_n=P_n\cdot\Delta T/T(n-1) \quad (5)$$

and therefore, at an interval of $\Delta T$ sec., the pulse number corresponding to $|P_n|$ is added to or subtracted from said register. Whether the addition should be made is determined by the relation between the direction of drive determined at first and the direction of movement of the object image surface, i.e., the relation between the signs of $D_n'$ and $P_n$.

$\Delta T$ is a fixed time, and assuming that it is less than order of 1/10 of the storage time, it can be considered that constant speed drive has substantially been effected during the storage.

In this manner, the lens driving progresses with the broken line R of FIG. 17 as the target, and at a point of time whereat Q' and R intersect each other, the event counter value Event becomes equal to the register value Regis and the EVC interrupt occurs. At step S1410, the EVC interrupt is set to inhibition, and at step S1411, a short brake is applied to the lens driving to stop the lens and simultaneously therewith, the addition of $\Delta P_n$ to the register is stopped.

At step S1412, whether there is any movement of the object is discriminated, and if there is a movement of the object, the in-focus operation such as the permission of the mirror-up and the turn-on of the in-focus display for a predetermined time is performed at step S1413.

At step S1414, the amounts necessary for calculation at the next time, such as $P_n$ and $D_n$, are stored to bring about $n \leftarrow n+1$.

At step S1415, if in the mirror-down state, return is directly made to step S2, and if in the mirror-up state, the mirror-down is waited for, and then return is made to step S2.

On the other hand, if it is judged at step S1402 that there is no movement of the object, the ordinary processing routine of step S1416 and subsequent steps is entered.

At step S1416, a flag indicative of the fact that there is no movement of the object is provided, and at step S1417, the defocus amount $D_n$ is intactly adopted as the drive amount $D_{n'}$.

At step S1418, the magnitudes of $|D_{n'}|$ and $\delta c$ are discriminated, and if $|D_{n'}|\leq\delta c$, the in-focus operation, i.e., the turn-on of the in-focus display and the mirror-up permission, is effected at step S1422.

Thereafter, skip is made to step S1414.

If $|D_{n'}|>\delta c$ at step S1418, when the in-focus display is turned on, it is turned off at step S1419, and at step S1420, the driving is started, and at step S1421, the EVC interrupt is permitted and the termination of the driving is waited for.

As described above, according to the present embodiment, if the storage time, the calculation time, the film advance time, the driving time, etc. fluctuate more or less for some reason or other, the drive amount necessary for pursuit is changed in conformity with the lapse of time and therefore, photographing which is in focus becomes possible without fail. In FIG. 17, the dots-and-dash line S shows in an exaggerated manner a case where the film advance is prolonged and the start of the lens driving is delayed, but it shows that since the lens is driven until the line S intersects the desired broken line R, there is no problem even if there is a time delay.

The embodiments hitherto described are based on the premise that the lens driving is not effected at all during the storage time and during the calculation time, and in that sense, they can be said to be the pursuit driving system which presupposes the intermittent drive. In the case of the intermittent drive, the processing is time-serial and therefore, the CPU need not perform multi-task and in that sense, this system can be said to be excellent.

Also, where the power source for driving the lens is used in common with the ordinary power source for operating the camera, there occurs the limitation that for example, during the film advance, the motor for driving the lens must be stopped. In such case, the lens driving must be intermittent and therefore, the intermittent drive pursuit system hitherto described is very fit to the system having such limitation.

[Seventh Embodiment]

However, in a system wherein the lens driving is always possible, it is possible to substantially continuously pursue the movement of the object, and this has the advantage that the movement can appear smooth to the eye which looks into the viewfinder. In the following seventh embodiment, such a method of continuous pursuit will be described.

Briefing the essential point of the present embodiment, the present embodiment is basically based on the same form of drive as the ordinary intermittent drive as the premise, and when the defocus amount $D_n$ is calculated, the lens is driven by that amount (this will hereinafter be called the convergence drive) and upon termination of the drive, storage is started. When it is judged that there is a movement of the object, as regards the corrective drive amount accompanying such movement of the object, drive is uniformly effected at a constant speed throughout the periods of storage, calculation and drive. Thus, the lens smoothly pursues the movement of the object. The present embodiment is similar to Japanese Laid-Open Patent Application No. 214325/1985 in that the lens pursues the movement of the object continuously, but the already described problems peculiar to this prior application have been solved. In this case, movement of the lens is also effected during the period of storage and therefore, the correction of that is necessary, but the movement during the storage is at a constant speed and therefore, the correction is easy. Also, the driving only for pursuit (hereinafter referred to as the pursuit driving) is not at so high a speed and therefore, its influence upon the result of the error of time measurement is small.

Figure 20:
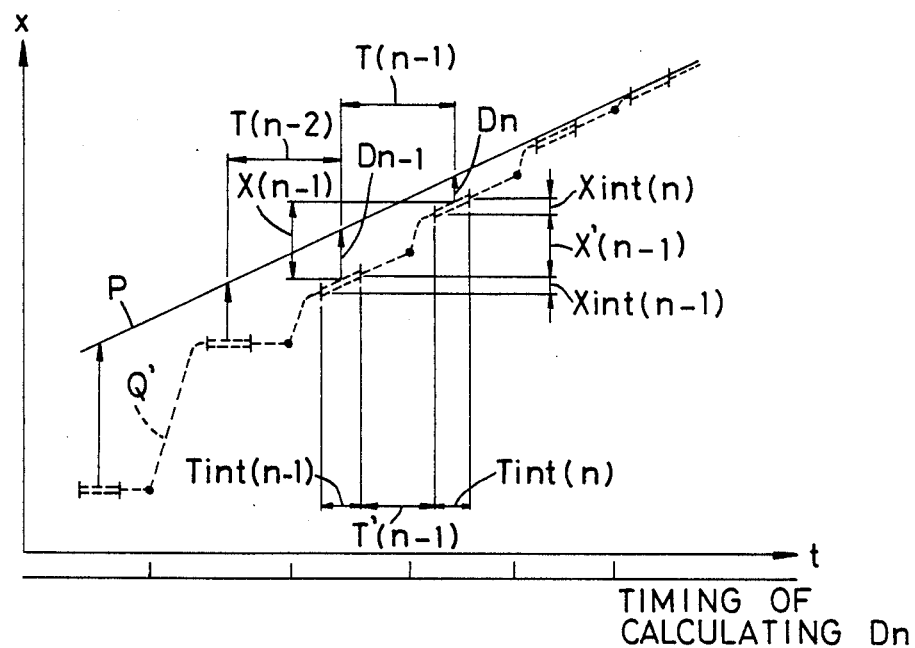
FIGS. 20, 21 and 22 are graphs showing the timing during photography of the automatic focus adjusting apparatus of the present invention.
Figure 21:
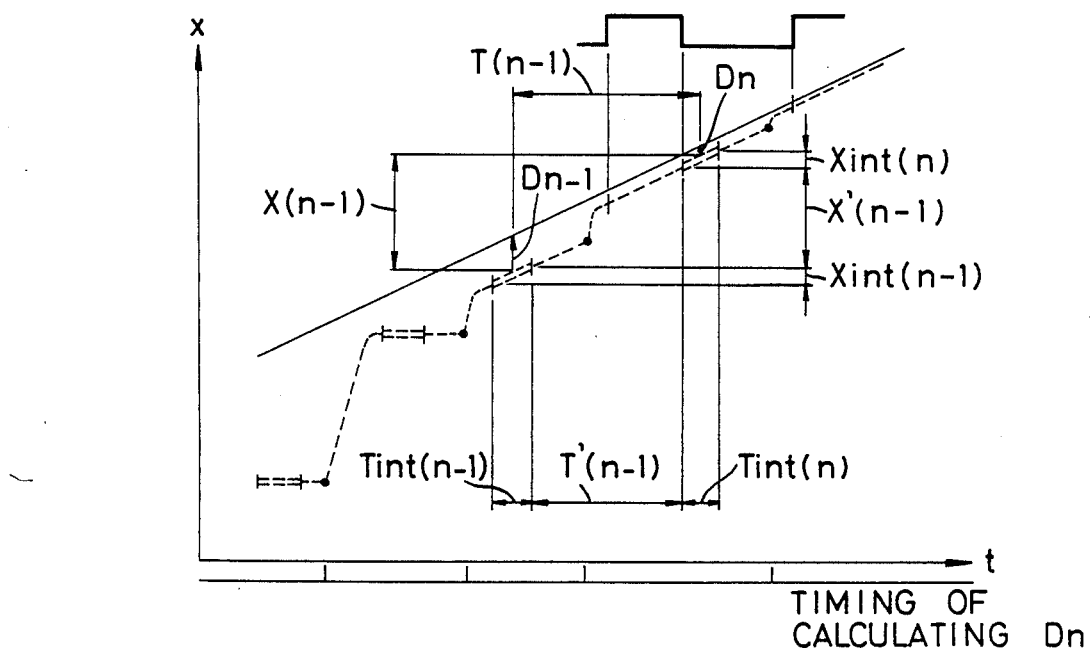
Figure 22:
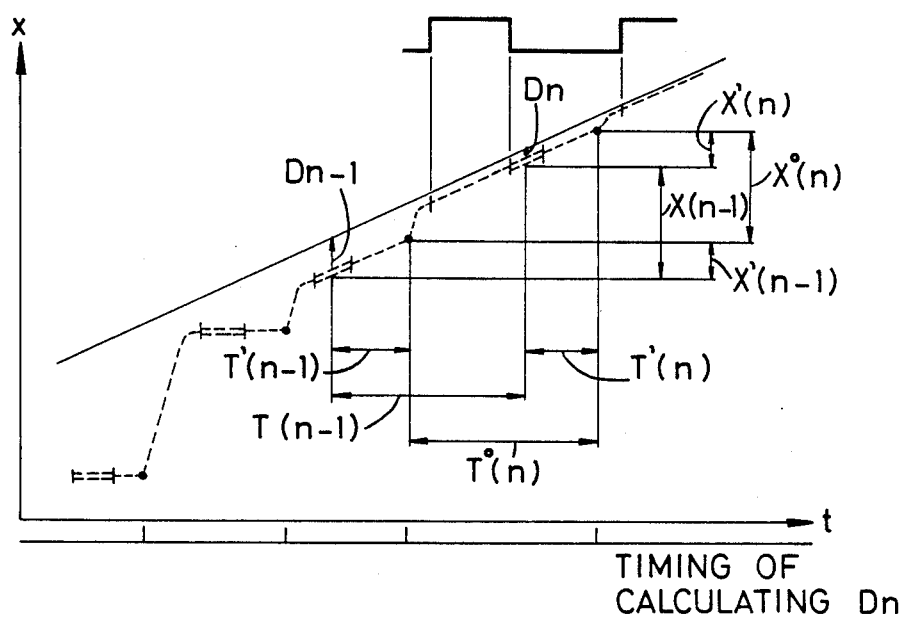

The time charts when pursuit has been effected on the basis of such a purport are shown in FIGS. 20 and 21. FIG. 20 refers to a case where there is no mirror-up movement, and FIG. 21 shows a case where continuous exposure is effected upon achievement of the in-focus.

The difference between the two is the difference between whether storage is started immediately after the termination of the convergence drive and whether storage is started after a period during which the mirror is up. In the present embodiment, the pursuit driving continues under any operating conditions and therefore, even if there occurs a mirror-up state in the course of the operation, the amount of movement of the object during this period is corrected every moment, and this leads to the advantage that the correction for adjusting the timing of the exposure as described in the previous embodiments is not required.

A description will now be given of the parameters shown in FIGS. 20 and 21. The defocus amount $D_n$ is found at the timing of the termination of calculation, and the value thereof corresponds to the distance between P and Q' at the midpoint of the storage time. Also the nth storage time is Tint(n), the time from the termination of the last storage till the start of the current storage is $T'(n-1)$, and the time from the midpoint of the last storage time till the midpoint of the current storage time is $T(n-1)$. That is, $$T(n-1) = \frac{\text{Tint}(n-1)}{2} + T'(n-1) + \frac{\text{Tint}(n)}{2} \quad (6)$$

The amounts of drive during these respective times are Xint(n), $X'(n-1)$ and $X(n-1)$ in terms of the movement of the image surface. Accordingly, $$X(n-1) = \frac{\text{Xint}(n-1)}{2} + X'(n-1) + \frac{\text{Xint}(n)}{2} \quad (7)$$

Figure 23:
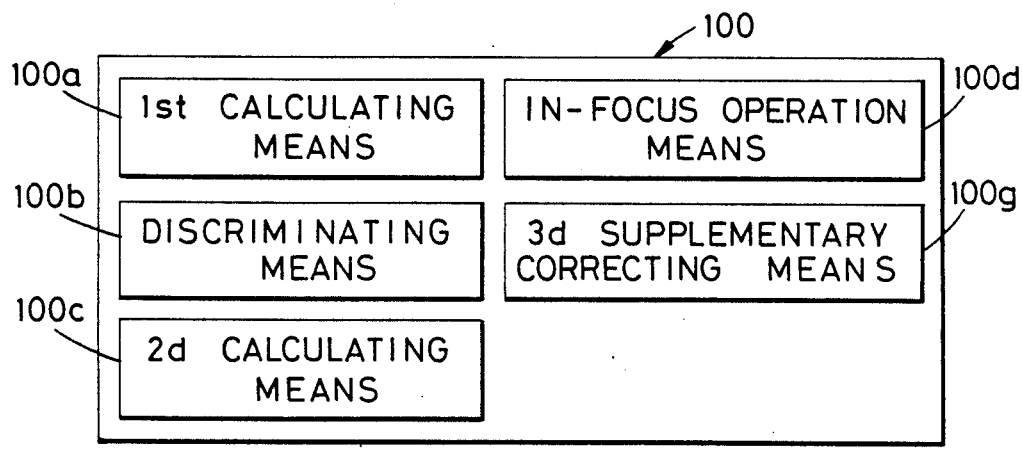
FIG. 23 is a block diagram of the correcting means of said automatic focus adjusting apparatus.

FIG. 23 shows main correcting means 100 having third supplementary correcting means 100g for accomplishing the above-described operation.

Figure 24A:
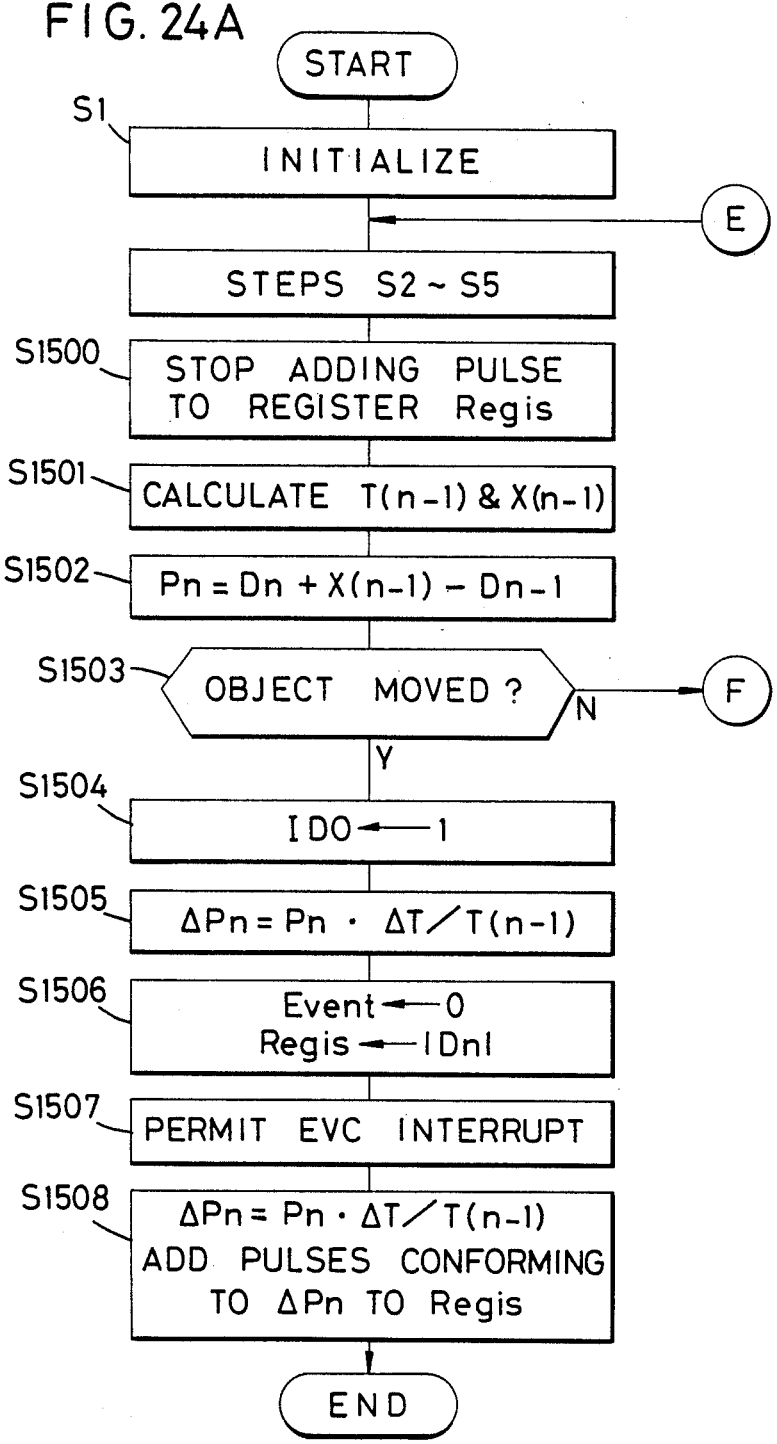
FIG. 24A, 24B and 24C are flow charts of the automatic focus adjusting apparatus of FIG. 23.
Figure 24B:
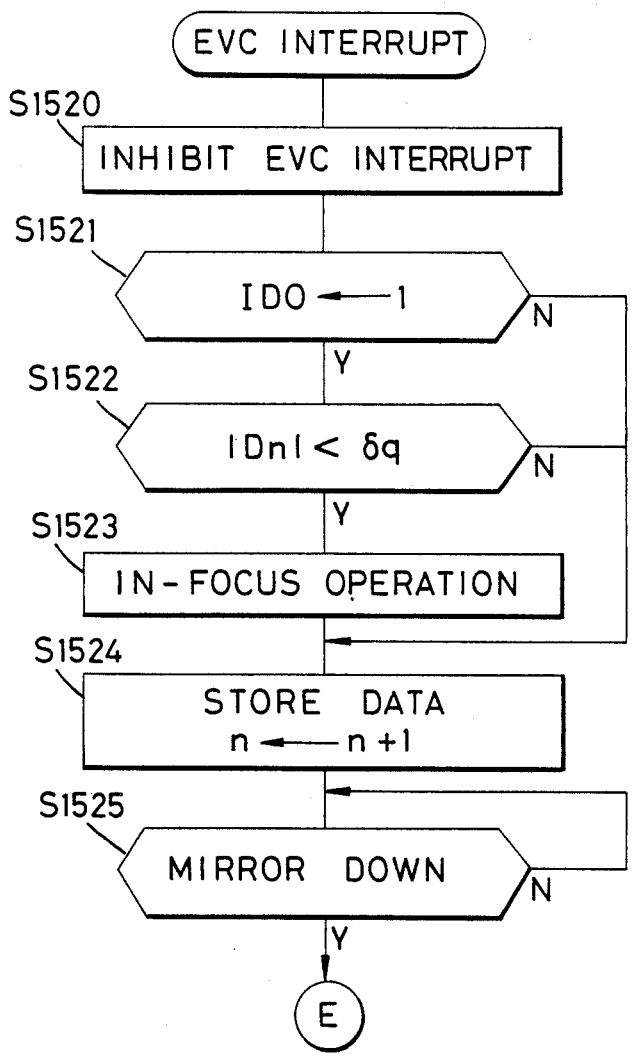
Figure 24C:
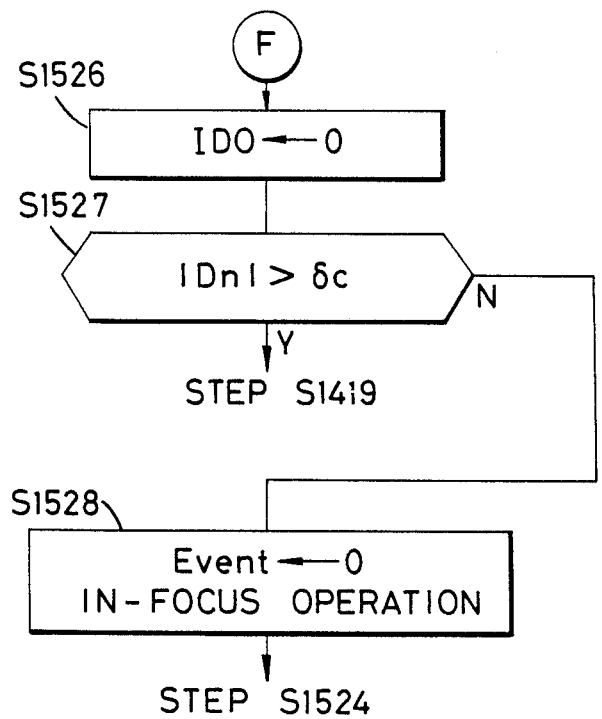

The flow of the operation will now be described with reference to the flow charts of FIGS. 24A, 24B and 24C.

Steps S1, S2, S3, S4 and S5 are similar to those described hitherto.

At the next step S1500, the addition to the register Regis of the pulse of a number corresponding to the magnitude of $\Delta P_n$ which has been effected at a time interval $\Delta T$ sufficiently short as compared with the storage time is once discontinued, that is, it is stopped if the pursuit driving has been effected during the storage and the calculation.

At step S1501, $T(n-1)$ and $X(n-1)$ are calculated from the aforementioned equations. In order that this may be possible, it is necessary to pre-read the value of the timer and the value of the event counter at the timings of the start and termination of the storage, whereby the aforementioned values Tint(n), $T'(n-1)$, Xint(n) and $X'(n-1)$ can be calculated and accordingly, $T(n-1)$ and $X(n-1)$ can be calculated. Then at step S1502, the amount of convergence deficiency $P_n$ is calculated by the first calculating means 100a of FIG. 23 from the following equation:

$$P_n = D_n X(n-1) - D_{n-1}$$

Step S1503 corresponds to the object movement discriminating means 100b, and at this step, whether there is any movement of the object is discriminated by the method as described in the first and second embodiments.

If there is a movement of the object, the flag IDO corresponding to the presence of movement of the object is set to 1 at step S1504, and at step S1505, the amount of movement $\Delta P_n$ of the object per unit time $\Delta T$ is calculated from the following equation: $\Delta P_n = P_n \cdot \Delta T / T(n-1)$. In this embodiment, this step S1505 corresponds to the second calculating means 100c.

At step S1506, the content of the event counter is set to zero (Event=0), and a pulse number corresponding to $|D_n|$ is set in the register Regis. At this moment, the lens driving is automatically started, and the direction of movement of the lens is controlled by a flag provided specially in conformity with the positive or the negative of $D_n$.

Then, at step S1507, the EVC interrupt which conditions the termination of the convergence drive is permitted. At step S1508, a pulse number conforming to $\Delta P_n$ is added to the register Regis at an interval of $\Delta T$, and this operation is continued until the step S1500 in the next cycle is reached. That is, from step S1500 till the step S1500 in the next cycle, the desired drive amount increases (or decreases) always at a constant speed. Thus the lens driving is effected at a constant speed during the periods other than the convergence drive, i.e., during the storage and the calculation, as well as during the period of mirror-up. From step S1506, the convergence drive is started, but in the meantime, the content Event of the event counter which is totalling the feedback pulse from the monitor means becomes equal to the register value Regis and the EVC interrupt occurs. In response thereto, shift is made to step S1520, and the EVC interrupt thereafter is inhibited. After this, the register value Regis also continues to increase at a predetermined speed and therefore, while pursuing this, the lens continues its constant-speed pursuit driving and following this, the value Event of the event counter also increases, that is, increases while keeping the balanced state of Regis≈Event. This state corresponds to the constant-speed pursuit driving. Subsequently, at step S1521, it is judged that there is a movement of the object (IDO=1), and when at step S1522, it is judged that the defocus amount $|D_n|<\delta q$, the in-focus operation is performed at step S1523. The substance thereof is the permission of mirror-up and the turn-on of the in-focus display for a predetermined period of time. $\delta q$, like $\delta c$, etc., has been suitably set.

Then, at step S1524, the data necessary for the calculation of time is stored, and n is changed to n+1. At step S1525, whether the mirror is in the mirror-down state at present is judged, and if it is in the mirror-down state, advance is made to step S2, where the next storage is started. If at step S1503, it is judged that there is no movement of the object, advance is made to step S1526, but the steps subsequent thereto are the same as those of FIG. 20 and therefore need not be described.

As described above, in the present embodiment, when a movement of the object is detected, the lens is driven at a constant speed in accord with the movement speed of the object to thereby offset the component by the movement of the object and therefore, high but non-constant speed drive (convergence drive) can be effected by an amount corresponding to the calculated defocus amount from after the termination of the calculation. With the termination of the convergence drive, the next constant-speed drive is started and at the same time, the storage is resumed. Because of such a form of drive, not only a good impression that the lens smoothly follows the movement of the object is given to the eye, but also there is no problem even if the timing of the storage changes with the mirror-up or the like intervening, whereby photographs which are in focus can always be taken.

[Eighth Embodiment]

The method of discriminating whether there is any movement of the object will again be described in the following eighth embodiment.

The substance of the object movement discriminating means 100b has been described with respect to the simplest form thereof in the first embodiment, and the method of further enhanced accuracy has been described in the second embodiment. Here, a description will be given of a method of more accurately discriminating whether there is any movement of the object, by adding the element of time.

The steps S1005 and S1006 (FIG. 25) correspond to it. That is, what is obtained by replacing step S1002 with the strict speed of movement of the object is $$\frac{|P_n|}{T(n-1)} > k' \cdot \frac{|P_{n-1}|}{T(n-2)}$$

of step S1005, and what is obtained by replacing step S1003 with the comparison of the strict speed is $$\frac{|P_n|}{T(n-1)} < r' \cdot \frac{|P_{n-1}|}{T(n-2)}$$

of step S1006.

Figure 25:
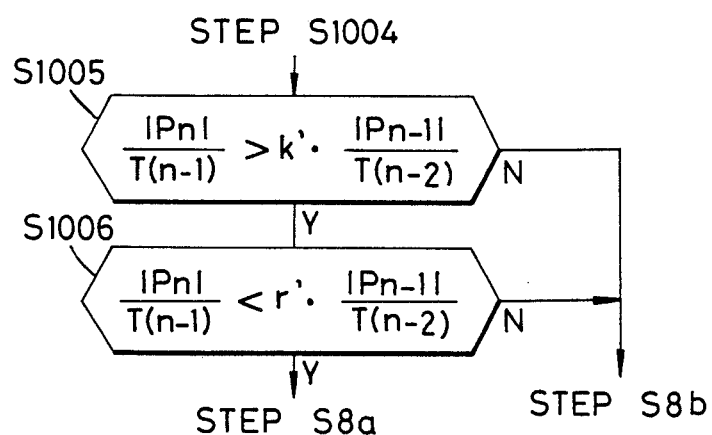
FIG. 25 is a flow chart of an eighth embodiment of the present invention.

In the actual use, steps S1005 and S1006 may be used in place of steps S1002 and S1003, but as shown in FIG. 25, both may be used in a series. In that case, at steps S1002 and S1003, the conditions will be set more loosely than at steps S1005 and S1006 and thus, $0<k<k'<1<r'<r$. The specific values of these coefficients may preferably be $k\approx 0.3-0.5$, $k'\approx 0.5-0.7$, $r'\approx 1.4-2$ and $r\approx 2-3$.

As described above, according to the eighth embodiment, more strict comparison is made with the speed of movement of the object and this leads to the advantage that the accuracy of the judgement as to whether there is any movement of the object is improved.

As described above, according to the present invention, the correction of the amount of lens driving accompanies the movement of the object and therefore, it is possible to maintain the in-focus state even for a moving object. Also, such lens driving of varying speed is not effected during the charge storage. High but non-constant speed lens driving is effected only after the termination of the calculation and before the start of the next charge storage, and the lens is stopped or driven at a constant speed during the charge storage. Therefore, in spite of the addition of the pursuit driving, the defocus amount calculated does not become indefinite, and thus stable pursuit driving is possible.

What is claimed is:

1. An automatic focus adjusting apparatus having an imaging optical system for forming the optical image of an object, focus detecting means using a charge storage type image sensor outputting a defocus amount corresponding to the distance in the direction of the optic axis between the imaging plane of said imaging optical system and a predetermined imaging plane, lens driving means for driving the focus adjusting optical system of said imaging optical system, monitor means for detecting the amount of movement of said focus adjusting optical system, and control means responsive to the output of said focus detecting means and the output of said monitor means to control said lens driving means, characterized in that said apparatus has correcting means for receiving the output of said focus detecting means and the output of said monitor means with movement of said object and calculating a correction amount necessary for the driving of said focus adjusting optical system to pursue the movement of said object, and said control means controls said lens driving means so that an amount of movement of said focus adjusting optical system including the correction amount from said correcting means is attained, and so that throughout each charge storage time of said focus detecting means there is no substantial change in the speed of movement of said focus adjusting optical system.

2. An automatic focus adjusting apparatus for adjusting a photo-taking lens of a camera, comprising:
(a) focus detecting means for producing a defocus amount conforming to the distance in the direction of the optic axis between a predetermined plane and the image of an object to be photographed by said photo-taking lens, said focus detecting means having charge storage type image sensor means;
(b) driving means for driving said photo-taking lens;
(c) control means for causing said charge storage type image sensor means to start storing charges after the top of the driving of said photo-taking lens, and for causing said driving means to remain stopped throughout the charge storage time of said charge storage type image sensor means; and
(d) correcting means for calculating a correction amount necessary for the driving of said photo-taking lens to pursue movement of the object to be photographed;
(e) said control means controlling said driving means so that an amount of the driving of said photo-taking lens including said correction amount is attained.

3. An automatic focus adjusting apparatus for adjusting a photo-taking lens of a camera, comprising:
(a) focus detecting means for producing a defocus amount conforming to the distance in the direction of the optic axis between a predetermined plane and the image of an object to be photographed by said photo-taking lens, said focus detecting means having charge storage type image sensor means and calculating means for calculating said defocus amount on the basis of the output of said charge storage type image sensor means;
(b) driving means for driving said photo-taking lens;
(c) correcting means for calculating a correction amount necessary for the driving of said photo-taking lens to pursue movement of the object to be photographed; and
(d) control means for controlling said driving means so that during the charge storage time of said charge storage type image sensor means the photo-taking lens is driven at a constant velocity on the basis of said correction amount irrespective of said defocus amount and is not driven on the basis of said defocus amount.

4. An automatic focus adjusting apparatus for adjusting a photo-taking lens of a camera, comprising;
(a) focus detecting means for repeatedly performing a focus detection operation and producing a defocus signal for each focus detection operation, said defocus signal conforming to the distance in the direction of the optic axis between a predetermined plane and the image of an object to be photographed by said photo-taking lens;
(b) driving means for driving said photo-taking lens;
(c) means for producing a convergence deficiency signal conforming to movement of the object within a period between two successive focus detection operations, said convergence deficiency signal indicating direction of movement of the object; and
(d) correcting means for multiplying an amount conforming to said convergence deficiency signal by a coefficient to provide a correction amount necessary for the driving of said photo-taking lens to pursue the movement of the object, said correcting means detecting the direction of the movement of the object on the basis of said convergence deficiency signal and changing the value of said coefficient.

5. An apparatus according to claim 4, wherein said correcting means sets said coefficient to a first value when said correcting means detects that the object moves toward said camera, and wherein said correcting means sets said coefficient to a second value when said correcting means detects that the object moves away from aid camera.

6. An automatic focus adjusting apparatus for adjusting a photo-taking lens of a camera which has exposing means for performing an exposure operation, comprising:
(a) focus detecting means for repeatedly producing a defocus signal according to the distance in the direction of the optic axis between a predetermined plane and the image of an object to be photographed by said photo-taking lens, said focus detecting means having a charge storage type image sensor;
(b) driving means for driving said photo-taking lens;
(c) movement determining means responsive to said defocus signal for determining whether the object to be photographed moves, and producing a movement determining signal;
(d) first correcting means for calculating a correction amount necessary for the driving of said photo-taking lens to pursue movement of the object to be photographed when said movement determining signal indicates that the object to be photographed moves;
(e) control means for controlling said driving means and said exposing means so that a focus detecting operation of said focus detecting means and said exposure operation are performed repeatedly; and
(f) second correcting means for correcting said correction amount after the first of a plurality of successive exposure operations.

7. An automatic focus adjusting apparatus according to claim 6, wherein said second correcting means adds another correction amount to said correction amount of said first correction means.

8. An automatic focus adjusting apparatus according to claim 7, wherein said another correction amount of said second correction means is a constant amount.

9. An automatic focus adjusting apparatus according to claim 6, which further comprises means for producing a velocity signal according to the velocity of the movement of the object, wherein said second correction means calculates a second correction amount on the basis of said velocity signal.

10. An automatic focus adjusting apparatus for adjusting a photo-taking lens of a camera which has mirror-up means for performing a mirror-up operation, comprising:
 (a) focus detecting means for repeatedly producing a defocus signal according to the distance in the direction of the optic axis between a predetermined plane and the image of an object to be photographed by said photo-taking lens;
 (b) driving means for driving said photo-taking lens;
 (c) movement determining means responsive to said defocus signal for determining whether the object to be photographed moves, and producing a movement determining signal;
 (d) focus determining means for determining on the basis of said defocus signal whether the distance in the direction of the optic axis between said predetermined plane and the image of the object is within a predetermined range when said movement determining signal indicates that the object to be photographed does not move, and producing a focus determining signal;
 (e) correcting means for calculating a correction amount necessary for the driving of said photo-taking lens to pursue movement of the object to be photographed when said movement determining signal indicates that the object to be photographed moves; and
 (f) control means for controlling said mirror-up means and said driving means, said control means starting said driving means driving said photo-taking lens on the basis of said defocus signal and said correction amount and thereafter causing said mirror-up means to perform said mirror-up operation, when said movement determining signal indicates the object to be photographed moves, said control means causing said driving means to drive said photo-taking lens on the basis of said defocus signal without performing said mirror-up operation when said focus determining signal indicates that the distance in the direction of the optical axis between said predetermined plane and the image of the object is not within said predetermined range, said control means causing said mirror-up means to perform said mirror-up operation without driving said photo-taking lens when said focus determining signal indicates that the distance in the direction of the optical axis between said predetermined plane and the image of the object is within said predetermined range.

11. An automatic focus adjusting apparatus for adjusting a photo-taking lens of a camera which has a mirror-up means for performing a mirror-up operation and exposing means responsive to said mirror-up operation for performing an exposure operation, comprising:
 (a) focusing detecting means for repeatedly producing a defocus signal according to the distance in the direction of the optic axis between a predetermined plane and the image of an object to be photographed by said photo-taking lens, said focus detecting means having a charge storage type image sensor;
 (b) driving means for driving said photo-taking lens;
 (c) movement determining means responsive to said defocus signal for determining whether the object to be photographed moves, and producing a movement determining signal;
 (d) correcting means for calculating a correction amount necessary for the driving of said photo-taking lens to pursue movement of the object to be photographed when said movement determining signal indicates that the object to be photographed moves; and
 (e) control means for causing said driving means to drive said photo-taking lens on the basis of said defocus signal and said correction amount, said control means controlling said driving means so that the distance in the direction of the optic axis between said predetermined plane and the image of the object comes within a predetermined range during the charge storage time of said charge storage type image sensor before said mirror-up means performs said mirror-up operation, said control means controlling said driving means so that the distance in the direction of the optic axis between said predetermined plane and the image of the object comes within said predetermined range during said exposing operation after said mirror-up means performs said mirror-up operation.

12. An automatic focus adjusting apparatus according to claim 11, wherein said mirror-up means performs said mirror-up operation after the start of the driving of said photo-taking lens when said movement determining signal indicates that the object moves.

13. An Automatic focus adjusting apparatus according to claim 11, wherein said control means has remaining amount detecting means for detecting, after the start of the photo-taking lens drive, that the remaining drive amount of said photo-taking lens is within a predetermined range when said movement determining signal indicates that the object to be photographed moves, and for producing a detection signal, and wherein said control means causes said mirror-up means to perform said mirror-up operation in response to said detection signal.

14. An automatic focus adjusting apparatus for adjusting a photo-taking lens of a camera, comprising:
 (a) focus detecting means for repeatedly performing a focus detection operation and producing a defocus signal for each focus detection operation, said defocus signal indicating the amount of the distance in the direction of the optic axis between a predetermined plane and the image of an object to be photographed by said photo-taking lens;
 (b) driving means for driving said photo-taking lens;
 (c) means responsive to said defocus signal for producing a convergence deficiency signal according to an amount of the movement of the object within a period between two successive focus detection operations; and
 movement determining means for comparing a ratio of the amount of the older one of two successive convergence deficiency signals to the amount of the newer one of the two successive convergence deficiency signals with a predetermined value, and thereby determining whether the object to be photographed moves.

15. An automatic focus adjusting apparatus for adjusting a photo-taking lens of a camera, comprising:
 (a) focus detecting means for repeatedly performing a focus detection operation and producing a defocus signal for each focus detection operation, said defocus signal indicating the amount of the distance in the direction of the optic axis between a predetermined plane and the image of an object to be photographed by said photo-taking lens;
 (b) driving means for driving said photo-taking lens;
 (c) means responsive to said defocus signal for producing a convergence deficiency signal according to an amount of the movement of the object within a period between two successive focus detection operations; and movement determining means for detecting whether a ratio of the amount of the older one of two successive convergence deficiency signals to the amount of the newer one of the two successive convergence deficiency signals with a predetermined value, and thereby determining whether the object to be photographed moves.

16. An automatic focus adjusting apparatus for adjusting a photo-taking lens of a camera, comprising:
   (a) focus detecting means for repeatedly performing a focus detection operation and producing a defocus signal for each focus detection operation, said defocus signal indicating the amount of the distance in the direction of the optic axis between a predetermined plane and an image of an object to be photographed by said photo-taking lens;
   (b) driving means for driving said photo-taking lens;
   (c) means responsive to said defocus signal for producing a convergence deficiency signal which indicates the amount and the direction of the movement of the object within a period between two successive focus detection operations; and
   (d) movement determining means for detecting that the directions indicated by two successive convergence deficiency signals are the same and thereby determining that the object to be photographed moves.

17. An automatic focus adjusting apparatus for adjusting a photo-taking lens of a camera, comprising:
   (a) focus detecting means for repeatedly performing a focus detection operation and producing a defocus signal for each focus detection operation, said defocus signal indicating the amount of the distance in the direction of the optic axis between a predetermined plane and the image of an object to be photographed by said photo-taking lens;
   (b) driving means for driving said photo-taking lens;
   (c) means responsive to said defocus signal for producing a convergence deficiency signal according to an amount of the movement of the object within a period between two successive focus detection operations;
   (d) time detecting means responsive to said defocus signals for detecting the time period between two successive focus detection operations and producing a time detection signal; and
   (e) movement determining means based on two successive convergence deficiency signals and two successive time detection signals for detecting a first velocity of the object corresponding to the time period of the older one of said two successive time detection signals, detecting a second velocity of the object corresponding to the time period of the newer one of said two successive time detection signals, detecting that a ratio of said first velocity to said second velocity is larger than a predetermined value, and thereby determining that the object moves.

18. An automatic focus adjusting apparatus for adjusting a photo-taking lens of a camera, comprising:
   (a) focus detecting means for repeatedly performing a focus detection operation and producing a defocus signal for each focus detection operation, said defocus signal indicating the amount of the distance in the direction of the optic axis between a predetermined plane and the image of an object to be photographed by said photo-taking lens;
   (b) driving means for driving said photo-taking lens;
   (c) means responsive to said defocus signal for producing a convergence deficiency signal according to an amount of the movement of the object within a period between two successive focus detection operations;
   (d) time detecting means responsive to said defocus signals for detecting the time period between two successive focus detection operations and producing a time detection signal; and
   (e) movement determining means based on two successive convergence deficiency signals and two successive time detection signals for detecting a first velocity of the object corresponding to the time period of the older one of said two successive time detection signals, detecting a second velocity of the object corresponding to the time period of the newer one of said two successive time detection signals, detecting that a ratio of said first velocity to said second velocity is within a predetermined range, and thereby determining that the object moves.

19. An automatic focus adjusting apparatus for adjusting a photo-taking lens of a camera, comprising:
   (a) focus detecting means for repeatedly performing a focus detection operation and producing a defocus signal for each focus detection operation, said defocus signal indicating the amount of the distance in the direction of the optic axis between a predetermined plane and the image of an object to be photographed by said photo-taking lens;
   (b) driving means for driving said photo-taking lens;
   (c) movement determining means responsive to said defocus signal for determining whether the object to be photographed moves, and producing a movement determining signal,
   (d) means responsive to said defocus signal for producing a convergence deficiency signal according to an amount of the movement of the object within a period between two successive focus detection operations;
   (e) correcting means for calculating a correction amount necessary for the driving of said photo-taking lens to pursue movement of the object to be photographed when said movement determining signal indicates that the object moves, and calculating the sum of the amount of the defocus signal and said correction amount;
   (f) means responsive to said convergence deficiency signal for producing a movement amount signal according to the amount of movement of the object for a predetermined period which is shorter than the period between two successive focus detection operations; and
   (g) control means for causing said driving means to start driving said photo-taking lens on the basis of the sum of the amount of the defocus signal and said correction amount, and thereafter repeatedly causing said driving means to drive said photo-taking lens by the amount of said movement amount signal every said predetermined period.

20. An automatic focus adjusting apparatus for adjusting a photo-taking lens of a camera, comprising:
   (a) focus detecting means for repeatedly performing a focus detection operation and producing a defocus signal for each focus detection operation, said defocus signal indicating the amount of the distance in the direction of the optic axis between a predetermined plane and the image of an object to be photographed by said photo-taking lens;

(b) driving means for driving said photo-taking lens;

(c) means responsive to said defocus signal for producing a convergence deficiency signal according to an amount of the movement of the object within a period between two successive focus detection operations;

(d) means responsive to said convergence deficiency signal for producing a movement amount signal according to the amount of movement of the object for a predetermined period which is shorter than the period between two successive focus detection operations; and (e) control means for causing said driving means to start driving said photo-taking lens on the basis of the amount of said defocus signal, and thereafter repeatedly causing said driving means to drive said photo-taking lens on the basis of the amount of said movement amount signal every said predetermined period.

21. An automatic focus adjusting apparatus for adjusting a photo-taking lens of a camera, comprising:

(a) focus detecting means for repeatedly producing a defocus signal according to the distance in the direction of the optic axis between a predetermined plane and the image of an object to be photographed by said photo-taking lens;

(b) adding means responsive to said defocus signal for producing a convergence deficiency signal;

(c) driving means for driving said photo-taking lens;

(d) correcting means responsive to said convergence deficiency signal for repeatedly calculating a correction amount necessary for the driving of said photo-taking lens to pursue movement of the object to be photographed; and (e) control means for starting the operations of said focus detecting means, said adding means, said driving means and said correcting means, said adding means adding a predetermined amount to the amount of the first defocus signal and producing a first convergence deficiency signal, said adding means adding the last calculated correction amount to the amount of the newest defocus signal and producing the newest convergence deficiency signal, said correcting means calculating the newest correction amount on the basis of the newest convergence deficiency signal, said control means causing said driving means to drive said photo-taking lens on the basis of the amount of the newest defocus signal and the newest correction amount.

22. An automatic focus adjusting apparatus for adjusting a photo-taking lens of a camera, comprising:

(a) focus detecting means for producing a defocus amount conforming to the distance in the direction of the optic axis between a predetermined plane and the image of an object to be photographed by said photo-taking lens, said focus detecting means including charge storage type image sensor means and calculating means for calculating said defocus amount on the basis of the output of said charge storage type image sensor means, said focus detecting means having a charge storage period and a calculating period which follows said charge storage period, said charge storage type image sensor means storing charges according to the incident light thereon during said charge storage period, said calculating means calculating said defocus amount during said calculating period;

(b) driving means for driving said photo-taking lens;

(c) correcting means for calculating a correction amount necessary for driving of said photo-taking lens to pursue movement of the object to be photographed; and (d) control means for controlling said driving means so that said driving means drives said photo-taking lens at a constant velocity on the basis of said correction amount during said charge storage period and said calculating period, and drives said photo-taking lens on the basis of said defocus amount after said calculating period.

23. An apparatus according to claim 22, which further comprises object movement calculating means for calculating an amount with respect to the velocity of the movement of the object, and determining said constant velocity on the basis of said calculated amount.

24. An apparatus according to claim 22, wherein said control means does not cause said driving means to drive said photo-taking lens on the basis of said defocus amount during the charge storage period and the calculating period.

25. An apparatus according to claim 22, wherein said charge storage period, said calculating period, and the period for driving said photo-taking lens on the basis of said defocus amount are repetitive periods.

26. An automatic focus adjusting apparatus for adjusting a photo-taking lens of a camera, comprising:

(a) focus detecting means for producing a defocus amount conforming to the distance in the direction of the optic axis between a predetermined plane and the image of an object to be photographed by said photo-taking lens, said focus detecting means having charge storage type image sensor means;

(b) driving means for driving said photo-taking lens;

(c) control means for controlling said driving means on the basis of said defocus amount; and (d) correcting means for calculating a correction amount necessary for the driving of said photo-taking lens to pursue movement of the object to be photographed;

(e) said control means controlling said driving means so that an amount of the driving of said photo-taking lens including said correction amount is attained, and said control means controlling said driving means throughout each charge storage time of said charge storage type image sensor means so that there is no substantial change in the driving speed of said driving means.

* * * * *